(12) United States Patent
Zhuo et al.

(10) Patent No.: US 12,720,378 B2
(45) Date of Patent: Aug. 25, 2026

(54) METHOD AND APPARATUS FOR WIRELESS COMMUNICATION

(71) Applicant: Lenovo (Beijing) Limited, Beijing (CN)

(72) Inventors: Yibin Zhuo, Beijing (CN); Mingzeng Dai, Shanghai (CN); Lianhai Wu, Beijing (CN); Le Yan, Shanghai (CN); Congchi Zhang, Shanghai (CN)

(73) Assignee: Lenovo (Beijing) Limited, Beijing (CN)

(*) Notice: Subject to any disclaimer, the term of this patent is extended or adjusted under 35 U.S.C. 154(b) by 310 days.

(21) Appl. No.: 18/288,906

(22) PCT Filed: Apr. 30, 2021

(86) PCT No.: PCT/CN2021/091445
§ 371 (c)(1),
(2) Date: Oct. 30, 2023

(87) PCT Pub. No.: WO2022/226986
PCT Pub. Date: Nov. 3, 2022

(65) Prior Publication Data

US 2024/0214882 A1 Jun. 27, 2024
US 2026/0136246 A2 May 14, 2026

(51) Int. Cl.
*H04W 36/00* (2009.01)
*H04W 28/02* (2009.01)
*H04W 36/08* (2009.01)

(52) U.S. Cl.
CPC ... *H04W 36/0072* (2013.01); *H04W 28/0268* (2013.01); *H04W 36/087* (2023.05)

(58) Field of Classification Search
CPC . H04W 40/22; H04W 84/047; H04W 88/085; H04W 40/248; H04W 40/24;
(Continued)

(56) References Cited

U.S. PATENT DOCUMENTS 12,010,027 B2 * 6/2024 Akl .......................... H04W 8/04
12,302,363 B2 * 5/2025 Wu .......................... H04L 5/14
(Continued)

FOREIGN PATENT DOCUMENTS

CN 112584518 A 3/2021
EP 3780901 A1 2/2021
(Continued)

OTHER PUBLICATIONS

"Extended European Search Report", EP Application No. 21938460.9, Nov. 26, 2024, 8 pages.
(Continued)

*Primary Examiner* — Olumide Ajibade Akonai
(74) *Attorney, Agent, or Firm* — FIG. 1 Patents

(57) ABSTRACT

Embodiments of the present disclose a wireless communication in an IAB network. The method performed by an IAB node may include: transmitting, to a first IAB donor, a first resource configuration for a mobile terminal (MT) of the IAB node, wherein a distributed unit (DU) of the IAB node is connected to the first IAB donor and the MT of the IAB node is connected to or is for handing over to the second IAB donor; and receiving, from the first IAB donor, a second resource configuration for the DU of the IAB node, wherein the second resource configuration is determined based on the first resource configuration.

18 Claims, 10 Drawing Sheets

(58) Field of Classification Search
CPC . H04W 40/02; H04W 28/08; H04W 28/0835; H04W 28/0252; H04W 28/0861; H04W 28/10; H04W 28/02; H04W 36/087; H04W 40/36; H04W 92/20; H04W 40/04; H04L 45/02; H04L 45/74; H04L 47/24; H04L 47/2441; H04L 47/30; H04L 45/24
See application file for complete search history.

(56) References Cited

U.S. PATENT DOCUMENTS

| | | | | |
|---|---|---|---|---|
| 2021/0051512 | A1* | 2/2021 | Hampel ................ | H04W 40/22 |
| 2021/0160735 | A1 | 5/2021 | Fujishiro et al. | |
| 2023/0232285 | A1* | 7/2023 | Barac ................ | H04W 36/0088 370/331 |
| 2023/0328625 | A1* | 10/2023 | Xu ........................ | H04W 36/08 |

FOREIGN PATENT DOCUMENTS

| | | | |
|---|---|---|---|
| EP | 3782403 | B1 | 4/2024 |
| WO | 2019246446 | A1 | 12/2019 |
| WO | 2020032127 | A1 | 2/2020 |

OTHER PUBLICATIONS

"Foreign Office Action", JP Application No. 2023-566886, May 27, 2025, 9 pages.
Nokia, "Summary of Offline Discussion on Reduction of Service Interruption reduction", 3GPP TSG-RAN WG3 #110-e, R3-207165, Online, Nov. 2020, 31 pages.
Samsung, "Discussion on inter-donor IAB node migration procedure for Rel-17 IAB", 3GPP TSG-RAN WG3 Meeting #111e, R3-210216, Online, Jan. 2021, 11 pages.
Zte, et al., "Discussion on supporting CHO and DAPS in IAB", 3GPP TSG-RAN WG2 Meeting #113bis electronic, R2-2103141, Online, Apr. 2021, 9 pages.
Moderator (AT&T) , "Summary of [104b-e-NR-IAB-01] Maintenance of Integrated Access and Backhaul for NR", 3GPP TSG-RAN WG1 #104b-e, R1-210xxxx, e-Meeting [retrieved Dec. 5, 2023]., Apr. 2021, 11 pages.
PCT/CN2021/091445 , "International Preliminary Report on Patentability", PCT Application No. PCT/CN2021/091445, Nov. 9, 2023, 6 pages.
PCT/CN2021/091445 , "International Search Report and Written Opinion", PCT Application No. PCT/CN2021/091445, Feb. 7, 2022, 8 pages.
Qualcomm Incorporated , "Status Report to TSG", 3GPP TSG RAN Meeting #91e, RP-210443, Electronic Meeting [retrieved Dec. 5, 2023]. Retrieved from the Internet <https://www.3gpp.org/ftp/tsg_ran/TSG_RAN/TSGR_91e/Docs>, Mar. 2021, 16 pages.
Foreign Notice of Allowance issued in JP 2023-566886, mailed Dec. 8, 2025, 5 pages.

* cited by examiner

METHOD AND APPARATUS FOR WIRELESS COMMUNICATION

TECHNICAL FIELD

Embodiments of the present disclosure generally relate to wireless communication technology, and more particularly to wireless communication in an integrated access and backhaul (IAB) network.

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

To extend the coverage and availability of wireless communication systems (e.g., 5G systems), the 3rd generation partnership project (3GPP) is envisioning integrated access and backhaul (IAB) architecture for supporting multi-hop relays. In an IAB network, an IAB node may hop through one or more IAB nodes before reaching a base station (also referred to as "an IAB donor" or "a donor node"). A single hop may be considered a special instance of multiple hops. Multi-hop backhauling is beneficial because it provides a relatively greater coverage extension compared to single-hop backhauling. In a relatively high frequency radio communication system (e.g., radio signals transmitted in frequency bands over 6 GHz), relatively narrow or less signal coverage may benefit from multi-hop backhauling techniques.

The industry desires technologies for handling wireless communications in the IAB network.

SUMMARY

Some embodiments of the present disclosure provide a method performed by an integrated access and backhaul (IAB) node. The method may include: transmitting, to a first IAB donor, a first resource configuration for a mobile terminal (MT) of the IAB node, wherein a distributed unit (DU) of the IAB node is connected to the first IAB donor and the MT of the IAB node is connected to or is handing over to the second IAB donor; and receiving, from the first IAB donor, a second resource configuration for the DU of the IAB node, wherein the second resource configuration is determined based on the first resource configuration.

In some embodiments of the present disclosure, the transmitting the first resource configuration to the first IAB donor by the DU of the IAB node may be performed after receiving the first resource configuration for the MT of the IAB node. In some examples, the first resource configuration may be received from the second IAB donor. In some examples, the first resource configuration may be received from a parent IAB node of the IAB node, and the parent IAB node may be connected to the second IAB donor. In some examples, the first resource configuration may be received in a handover command from the first IAB donor.

Some embodiments of the present disclosure provide a method performed by an integrated access and backhaul (IAB) donor. The method may include: receiving a first resource configuration for a mobile terminal (MT) of an IAB node, wherein a distributed unit (DU) of the IAB node may be connected to the IAB donor and the MT of the IAB node may be connected to or may be handing over to another IAB donor; determining a second resource configuration for the DU of the IAB node based on the first resource configuration; and transmitting, to the IAB node, the second resource configuration.

In some examples, the first resource configuration may be received from the DU of the IAB node via an F1 interface. In some examples, the first resource configuration may be received from the another IAB donor via Xn interface signaling or via NG interface signaling relayed by a core network.

Some embodiments of the present disclosure provide a method performed by an integrated access and backhaul (IAB) donor. The method may include: receiving a first resource configuration for a distributed unit (DU) of an IAB node, wherein a mobile terminal (MT) of the IAB node may be connected to or may be handing over to the IAB donor and the DU of the IAB node may be connected to another IAB donor; and transmitting, to the IAB node, a second resource configuration for the MT of the IAB node, wherein the second resource configuration may be determined based on the first resource configuration.

In some examples, the first resource configuration may be received from the another IAB donor via Xn interface signaling. In some examples, the first resource configuration may be received from the another IAB donor via NG interface signaling relayed by a core network. In some examples, the first resource configuration may be received from the IAB node via radio resource control (RRC) signaling when the MT of the IAB node may be connected to the IAB donor.

In some examples, the second resource configuration may be transmitted to the IAB node via the another IAB donor. In some examples, the second resource configuration may be transmitted to the IAB node via radio resource control (RRC) signaling when the MT of the IAB node may be connected to the IAB donor.

In some embodiments of the present disclosure, the method may further include: transmitting the first resource configuration to a parent IAB node of the IAB node via an F1 interface, wherein the parent IAB node may be connected to the IAB donor; and receiving the second resource configuration from the parent IAB node via the F1 interface.

In some embodiments of the present disclosure, the method may further include: receiving, from the another IAB donor, multiplexing information of the IAB node, or receiving, from the IAB node, the multiplexing information via radio resource control (RRC) signaling when the MT of the IAB node may be connected to the IAB donor; and transmitting the multiplexing information to a parent IAB node of the IAB node via an F1 interface, wherein the parent IAB node may be connected to the IAB donor.

In some embodiments of the present disclosure, the second resource configuration may be determined further based on the multiplexing information.

Some embodiments of the present disclosure provide a method performed by an integrated access and backhaul (IAB) donor. The method may include: receiving, from another IAB donor, uplink (UL) ingress traffic information associated with an IAB node, wherein a mobile terminal (MT) of the IAB node may be connected to the IAB donor and a distributed unit (DU) of the IAB node may be connected to the another IAB donor; and transmitting, to the another IAB donor, at least one of a bearer mapping configuration associated with the IAB node and a UL routing configuration associated with the IAB node, wherein the bearer mapping configuration and UL routing configuration are based on the UL ingress traffic information.

The UL ingress traffic information may indicate an ingress channel of the IAB node or both the ingress channel and quality-of-service (QoS) information associated with the ingress channel.

The UL ingress traffic information may include at least one of: an ID of a UL ingress backhaul (BH) radio link control (RLC) channel (CH) between the IAB node and a child IAB node of the IAB node; the ID of the UL ingress BH RLC CH and quality-of-service (QoS) information associated with the UL ingress BH RLC CH; UL user plane (UP) transport network layer (TNL) information; and the UL UP TNL information, an ID of a data radio bearer (DRB) associated with the UL UP TNL information, and QoS information associated with the DRB.

The bearer mapping configuration may indicate at least one of: a mapping between a UL egress BH RLC CH between the IAB node and a parent node of the IAB node and the UL ingress BH RLC CH; and a mapping between the UL egress BH RLC CH and the UL UP TNL information.

The UL routing configuration may indicate at least one of: a mapping between a backhaul adaptation protocol (BAP) routing ID and the UL ingress BH RLC CH; and a mapping between the BAP routing ID and the UL UP TNL information.

The QoS information associated with the UL BH RLC CH may include at least one of: a guaranteed bit rate (GBR), an allocation and retention priority (ARP), and an aggregate maximum bit rate (AMBR).

The UL UP TNL information may include a general packet radio service tunneling protocol user plane (GTP-U) tunnel endpoint identifier (TEID) and at least one of a TNL address, a transport layer address, and a transport layer internet protocol (IP) address.

The at least one of the bearer mapping configuration and the UL routing configuration may be transmitted to the another IAB donor via Xn interface signaling, or via NG interface signaling relayed by a core network.

Some embodiments of the present disclosure provide a method performed by an integrated access and backhaul (IAB) donor. The method may include: transmitting, to another IAB donor, uplink (UL) ingress traffic information associated with an IAB node, wherein a mobile terminal (MT) of the IAB node may be connected to the another IAB donor and a distributed unit (DU) of the IAB node may be connected to the IAB donor; and receiving, from the another IAB donor, at least one of a bearer mapping configuration associated with the IAB node and a UL routing configuration associated with the IAB node, wherein the bearer mapping configuration and UL routing configuration are based on the UL ingress traffic information.

In some embodiments of the present disclosure, the method may further include: transmitting the at least one of the bearer mapping configuration and the UL routing configuration to the DU of the IAB node via an Flinterface.

The UL ingress traffic information may indicate an ingress channel of the IAB node or both the ingress channel and quality-of-service (QoS) information associated with the ingress channel.

The UL ingress traffic information may include at least one of: an ID of a UL ingress backhaul (BH) radio link control (RLC) channel (CH) between the IAB node and a child IAB node of the IAB node; the ID of the UL ingress BH RLC CH and quality-of-service (QoS) information associated with the UL ingress BH RLC CH; UL user plane (UP) transport network layer (TNL) information; and the UL UP TNL information, an ID of a data radio bearer (DRB) associated with the UL UP TNL information, and QoS information associated with the DRB.

The bearer mapping configuration may indicate at least one of: a mapping between a UL egress BH RLC CH between the IAB node and a parent node of the IAB node and the UL ingress BH RLC CH; and a mapping between the UL egress BH RLC CH and the UL UP TNL information. The UL routing configuration may indicate at least one of: a mapping between a backhaul adaptation protocol (BAP) routing ID and the UL ingress BH RLC CH; and a mapping between the BAP routing ID and the UL UP TNL information. The QoS information associated with the UL BH RLC CH may include at least one of: a guaranteed bit rate (GBR), an allocation and retention priority (ARP), and an aggregate maximum bit rate (AMBR). The UL UP TNL information may include a general packet radio service tunneling protocol user plane (GTP-U) tunnel endpoint identifier (TEID) and at least one of a TNL address, a transport layer address, and a transport layer internet protocol (IP) address.

The at least one of the bearer mapping configuration and the UL routing configuration may be received from the another IAB donor via Xn interface signaling, or via NG interface signaling relayed by a core network.

Some embodiments of the present disclosure provide a method performed by an integrated access and backhaul (IAB) donor. The method may include: transmitting, to an IAB node via an F1 interface, a message inquiring whether to migrate a distributed unit (DU) of the IAB node to another IAB donor, wherein the DU of the IAB node may be connected to the IAB donor and a mobile terminal (MT) of the IAB node may be connected to the another IAB donor; and receiving, from the IAB node via the F1 interface, a response message to the message.

In some examples, the response message may acknowledge the migration of the DU of the IAB node. In some examples, the response message may refuse the migration of the DU of the IAB node. In some embodiments of the present disclosure, the method may further include: in response to the response message acknowledging the migration of the DU of the IAB node, initiating a migration procedure of the DU of the IAB node to the another IAB donor.

Some embodiments of the present disclosure provide a method performed by an integrated access and backhaul (IAB) donor. The method may include: receiving, from an IAB node via an F1 interface, a message requesting a migration of a distributed unit (DU) of the IAB node to another IAB donor, wherein the DU of the IAB node may be connected to the IAB donor and a mobile terminal (MT) of the IAB node may be connected to the another IAB donor; and in response to the message, initiating a migration procedure of the DU of the IAB node to the another IAB donor; or transmitting, to the IAB node via the F1 interface, a message refusing the migration of the DU of the IAB node.

Some embodiments of the present disclosure provide a method performed by an integrated access and backhaul (IAB) node. The method may include: receiving, from an IAB donor via an F1 interface, a message inquiring whether to migrate a distributed unit (DU) of the IAB node to another IAB donor, wherein the DU of the IAB node may be connected to the IAB donor and a mobile terminal (MT) of the IAB node may be connected to the another IAB donor; and transmitting, to the IAB donor via the F1 interface, a response message to the message.

In some examples, the response message may acknowledge the migration of the DU of the IAB node. In some examples, the response message may refuse the migration of the DU of the IAB node.

Some embodiments of the present disclosure provide a method performed by an integrated access and backhaul (IAB) node. The method may include: transmitting, to an IAB donor via an F1 interface, a message requesting a migration of a distributed unit (DU) of the IAB node to another IAB donor, wherein the DU of the IAB node may be connected to the IAB donor and a mobile terminal (MT) of the IAB node may be connected to the another IAB donor. In some embodiments of the present disclosure, the method may further include: receiving, from the IAB donor via the F1 interface, a message refusing the migration of the DU of the IAB node.

Some embodiments of the present disclosure provide an integrated access and backhaul (IAB) node. The IAB node may include: a processor; and a transceiver coupled to the processor, wherein the transceiver may be configured to: transmit, to a first IAB donor, a first resource configuration for a mobile terminal (MT) of the IAB node, wherein a distributed unit (DU) of the IAB node is connected to the first IAB donor and the MT of the IAB node is connected to or is for handing over to the second IAB donor; and receive, from the first IAB donor, a second resource configuration for the DU of the IAB node, wherein the second resource configuration is determined based on the first resource configuration.

The transceiver may be configured to transmit, from the DU of the IAB node, the first resource configuration to the first IAB donor after the first resource configuration for the MT of the IAB node has been received. In some examples, the first resource configuration may be received from the second IAB donor. In some examples, the first resource configuration may be received from a parent IAB node of the IAB node, and the parent IAB node may be connected to the second IAB donor. In some examples, the first resource configuration may be received in a handover command from the first IAB donor.

Some embodiments of the present disclosure provide an integrated access and backhaul (IAB) donor. The IAB donor may include: a transceiver, wherein the transceiver may be configured to receive a first resource configuration for a mobile terminal (MT) of an IAB node, and wherein a distributed unit (DU) of the IAB node may be connected to the IAB donor and the MT of the IAB node may be connected to or may be handing over to another IAB donor; and a processor coupled to the transceiver, wherein the processor may be configured to determine a second resource configuration for the DU of the IAB node based on the first resource configuration, wherein the transceiver may be further configured to transmit, to the IAB node, the second resource configuration.

In some examples, the first resource configuration may be received from the DU of the IAB node via an F1 interface. In some examples, the first resource configuration may be received from the another IAB donor via Xn interface signaling or via NG interface signaling relayed by a core network.

Some embodiments of the present disclosure provide an integrated access and backhaul (IAB) donor. The IAB donor may include: a processor; and a transceiver coupled to the processor, wherein the transceiver may be configured to: receive a first resource configuration for a distributed unit (DU) of an IAB node, wherein a mobile terminal (MT) of the IAB node may be connected to or may be handing over to the IAB donor and the DU of the IAB node may be connected to another IAB donor; and transmit, to the IAB node, a second resource configuration for the MT of the IAB node, wherein the second resource configuration may be determined based on the first resource configuration.

In some examples, the first resource configuration may be received from the another IAB donor via Xn interface signaling. In some examples, the first resource configuration may be received from the another IAB donor via NG interface signaling relayed by a core network. In some examples, the first resource configuration may be received from the IAB node via radio resource control (RRC) signaling when the MT of the IAB node may be connected to the IAB donor.

In some examples, the second resource configuration may be transmitted to the IAB node via the another IAB donor. In some examples, the second resource configuration may be transmitted to the IAB node via radio resource control (RRC) signaling when the MT of the IAB node may be connected to the IAB donor.

The transceiver may be configured to: transmit the first resource configuration to a parent IAB node of the IAB node via an F1 interface, wherein the parent IAB node may be connected to the IAB donor; and receive the second resource configuration from the parent IAB node via the F1 interface.

The transceiver may be configured to: receive, from the another IAB donor, multiplexing information of the IAB node, or receive, from the IAB node, the multiplexing information via radio resource control (RRC) signaling when the MT of the IAB node may be connected to the IAB donor; and transmit the multiplexing information to a parent IAB node of the IAB node via an F1 interface, wherein the parent IAB node may be connected to the IAB donor. The second resource configuration may be determined further based on the multiplexing information.

Some embodiments of the present disclosure provide an integrated access and backhaul (IAB) donor. The IAB donor may include: a processor; and a transceiver coupled to the processor, wherein the transceiver may be configured to: receive, from another IAB donor, uplink (UL) ingress traffic information associated with an IAB node, wherein a mobile terminal (MT) of the IAB node may be connected to the IAB donor and a distributed unit (DU) of the IAB node may be connected to the another IAB donor; and transmit, to the another IAB donor, at least one of a bearer mapping configuration associated with the IAB node and a UL routing configuration associated with the IAB node, wherein the bearer mapping configuration and UL routing configuration are based on the UL ingress traffic information.

The UL ingress traffic information may indicate an ingress channel of the IAB node or both the ingress channel and quality-of-service (QoS) information associated with the ingress channel.

The UL ingress traffic information may include at least one of: an ID of a UL ingress backhaul (BH) radio link control (RLC) channel (CH) between the IAB node and a child IAB node of the IAB node; the ID of the UL ingress BH RLC CH and quality-of-service (QoS) information associated with the UL ingress BH RLC CH; UL user plane (UP) transport network layer (TNL) information; and the UL UP TNL information, an ID of a data radio bearer (DRB) associated with the UL UP TNL information, and QoS information associated with the DRB.

The bearer mapping configuration may indicate at least one of: a mapping between a UL egress BH RLC CH between the IAB node and a parent node of the IAB node and the UL ingress BH RLC CH; and a mapping between a UL egress BH RLC CH and the UL UP TNL information. The UL routing configuration may indicate at least one of: a mapping between a backhaul adaptation protocol (BAP) routing ID and the UL ingress BH RLC CH; and a mapping between the BAP routing ID and the UL UP TNL information. The QoS information associated with the UL BH RLC CH may include at least one of: a guaranteed bit rate (GBR), an allocation and retention priority (ARP), and an aggregate maximum bit rate (AMBR). The UL UP TNL information may include a general packet radio service tunneling protocol user plane (GTP-U) tunnel endpoint identifier (TEID) and at least one of a TNL address, a transport layer address, and a transport layer internet protocol (IP) address.

The at least one of the bearer mapping configuration and the UL routing configuration may be transmitted to the another IAB donor via Xn interface signaling, or via NG interface signaling relayed by a core network.

Some embodiments of the present disclosure provide an integrated access and backhaul (IAB) donor. The IAB donor may include: a processor; and a transceiver coupled to the processor, wherein the transceiver may be configured to: transmit, to another IAB donor, uplink (UL) ingress traffic information associated with an IAB node, wherein a mobile terminal (MT) of the IAB node may be connected to the another IAB donor and a distributed unit (DU) of the IAB node may be connected to the IAB donor; and receive, from the another IAB donor, at least one of a bearer mapping configuration associated with the IAB node and a UL routing configuration associated with the IAB node, wherein the bearer mapping configuration and UL routing configuration are based on the UL ingress traffic information.

The transceiver may be further configured to: transmit the at least one of the bearer mapping configuration and the UL routing configuration to the DU of the IAB node via an F1 interface.

The UL ingress traffic information may indicate an ingress channel of the IAB node or both the ingress channel and quality-of-service (QoS) information associated with the ingress channel.

The UL ingress traffic information may include at least one of: an ID of a UL ingress backhaul (BH) radio link control (RLC) channel (CH) between the IAB node and a child IAB node of the IAB node; the ID of the UL ingress BH RLC CH and quality-of-service (QoS) information associated with the UL ingress BH RLC CH; UL user plane (UP) transport network layer (TNL) information; and the UL UP TNL information, an ID of a data radio bearer (DRB) associated with the UL UP TNL information, and QoS information associated with the DRB.

The bearer mapping configuration may indicate at least one of: a mapping between a UL egress BH RLC CH between the IAB node and a parent node of the IAB node and the UL ingress BH RLC CH; and a mapping between the UL egress BH RLC CH and the UL UP TNL information. The UL routing configuration may indicate at least one of: a mapping between a backhaul adaptation protocol (BAP) routing ID and the UL ingress BH RLC CH; and a mapping between the BAP routing ID and the UL UP TNL information. The QoS information associated with the UL BH RLC CH may include at least one of: a guaranteed bit rate (GBR), an allocation and retention priority (ARP), and an aggregate maximum bit rate (AMBR). The UL UP TNL information may include a general packet radio service tunneling protocol user plane (GTP-U) tunnel endpoint identifier (TEID) and at least one of a TNL address, a transport layer address, and a transport layer internet protocol (IP) address.

The at least one of the bearer mapping configuration and the UL routing configuration may be received from the another IAB donor via Xn interface signaling, or via NG interface signaling relayed by a core network.

Some embodiments of the present disclosure provide an integrated access and backhaul (IAB) donor. The IAB donor may include: a processor; and a transceiver coupled to the processor, wherein the transceiver may be configured to: transmit, to an IAB node via an F1 interface, a message inquiring whether to migrate a distributed unit (DU) of the IAB node to another IAB donor, wherein the DU of the IAB node may be connected to the IAB donor and a mobile terminal (MT) of the IAB node may be connected to the another IAB donor; and receive, from the IAB node via the F1 interface, a response message to the message.

In some examples, the response message may acknowledge the migration of the DU of the IAB node. In some examples, the response message may refuse the migration of the DU of the IAB node.

In response to the response message acknowledging the migration of the DU of the IAB node, the processor may be configured to initiate a migration procedure of the DU of the IAB node to the another IAB donor.

Some embodiments of the present disclosure provide an integrated access and backhaul (IAB) donor. The IAB donor may include: a transceiver, wherein the transceiver may be configured to receive, from an IAB node via an F1 interface, a message requesting a migration of a distributed unit (DU) of the IAB node to another IAB donor, and wherein the DU of the IAB node may be connected to the IAB donor and a mobile terminal (MT) of the IAB node may be connected to the another IAB donor; and a processor coupled to the transceiver, wherein in response to the message, the processor may be configured to initiate a migration procedure of the DU of the IAB node to the another IAB donor; or the transceiver may be further configured to transmit, to the IAB node via the F1 interface, a message refusing the migration of the DU of the IAB node.

Some embodiments of the present disclosure provide an integrated access and backhaul (IAB) node. The IAB node may include: a processor; and a transceiver coupled to the processor, wherein the transceiver may be configured to: receive, from an IAB donor via an F1 interface, a message inquiring whether to migrate a distributed unit (DU) of the IAB node to another IAB donor, wherein the DU of the IAB node may be connected to the IAB donor and a mobile terminal (MT) of the IAB node may be connected to the another IAB donor; and transmit, to the IAB donor via the F1 interface, a response message to the message.

In some examples, the response message may acknowledge the migration of the DU of the IAB node. In some examples, the response message may refuse the migration of the DU of the IAB node.

Some embodiments of the present disclosure provide an integrated access and backhaul (IAB) node. The IAB node may include: a processor; and a transceiver coupled to the processor, wherein the transceiver may be configured to: transmit, to an IAB donor via an F1 interface, a message requesting a migration of a distributed unit (DU) of the IAB node to another IAB donor, wherein the DU of the IAB node may be connected to the IAB donor and a mobile terminal (MT) of the IAB node may be connected to the another IAB donor. The transceiver may be further configured to: receive, from the IAB donor via the F1 interface, a message refusing the migration of the DU of the IAB node.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

Embodiments of the present disclosure provide technical solutions to facilitate the deployment of the IAB node and can facilitate and improve the implementation of various communication technologies, such as 5G NR.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

Figure 1:
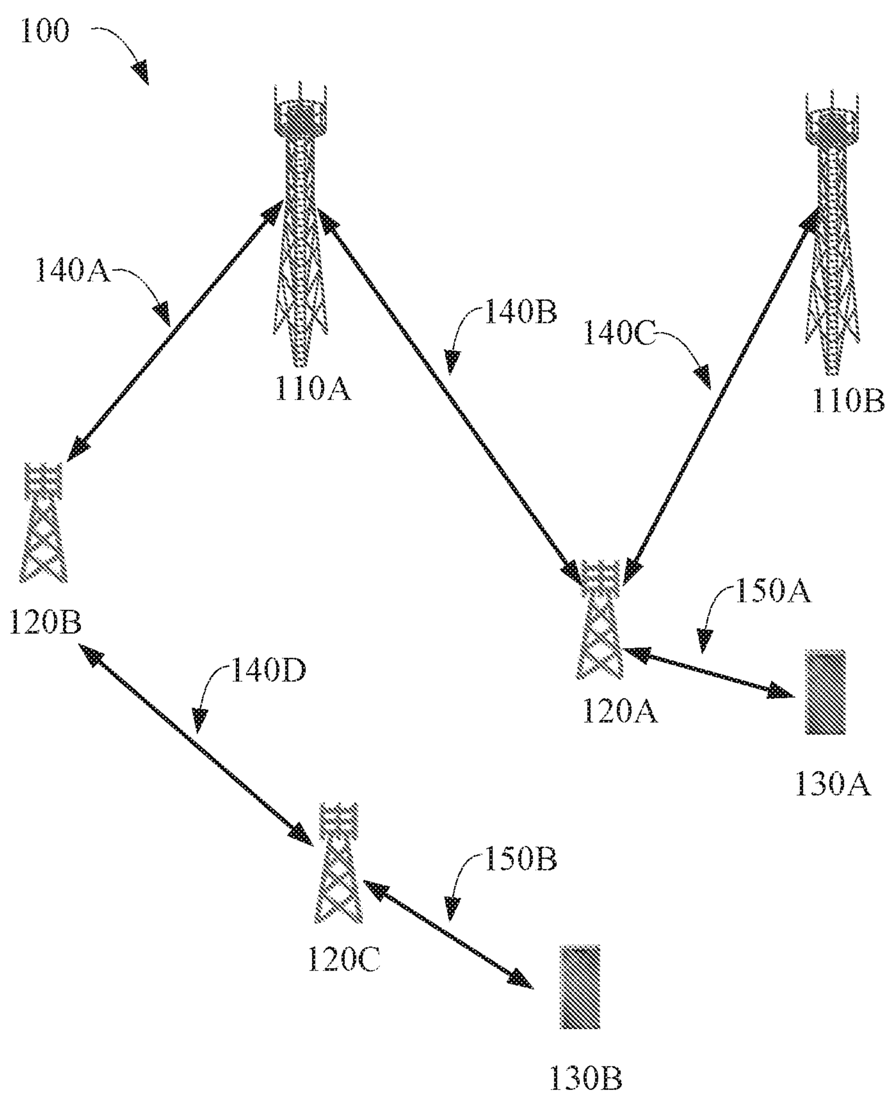
FIG. 1 illustrates a schematic diagram of a wireless communication system in accordance with some embodiments of the present disclosure.

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architectures and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Compared with the 4G communication system, the 5G communication system has raised more stringent requirements for various network performance indicators, for example, 1000-times capacity increase, wider coverage requirements, ultra-high reliability and ultra-low latency, etc. Considering the rich frequency resources of high-frequency carriers, the use of high-frequency small station deployments is becoming more and more popular in hotspot areas, in order to meet the needs of 5G ultra-high capacity. However, high-frequency carriers have poor propagation characteristics, severe attenuation due to obstructions, and limited coverage. Therefore, the dense deployment of small stations is required. On the other hand, the deployment of optical fiber is difficult and costly for these small stations. Therefore, an economical and convenient backhaul scheme is needed. Integrated Access and Backhaul (IAB) technology, whose access link and backhaul link both use wireless transmission solutions to avoid fiber deployment, provides ideas for solving the above problems.

In an IAB network, a relay node (RN) or IAB node or a wireless backhaul node/device can provide wireless access services for UEs. That is, a UE can connect to an IAB donor relayed by one or more IAB nodes. And the IAB donor may also be called a donor node or a donor base station (e.g., DgNB, Donor gNodeB). In addition, the wireless link between an IAB donor and an IAB node, or the wireless link between different IAB nodes can be referred to as "backhaul link."

An IAB node may include an IAB mobile terminal (MT) part and an IAB distributed unit (DU) part. When an IAB node connects to its parent node (which may be another IAB node or an IAB donor), it can be regarded as a UE, i.e., the role of the MT. When an IAB node provides service to its child node (which may be another IAB node or a UE), it can be regarded as a network device, i.e., the role of the DU.

An IAB donor can be an access network element with a complete base station function, or an access network element with a separate form of a centralized unit (CU) and a distributed unit (DU). The IAB donor may be connected to the core network (for example, connected to the 5G core network (5GC)), and provide the wireless backhaul function for the IAB nodes. The CU of an IAB donor may be referred to as "IAB donor-CU" (or directly referred to as "CU"), and the DU of the IAB donor may be referred to as "IAB donor-DU." The IAB donor-CU may be separated into a control plane (CP) and a user plane (UP). For example, a CU may include one CU-CP and one or more CU-UPs.

Considering the small coverage of the high frequency band, in order to ensure the coverage performance of the network, multi-hop networking may be adopted in an IAB network. Taking into account the requirements of service transmission reliability, IAB nodes can support dual connectivity (DC) or multi-connectivity to improve the reliability of transmission, so as to deal with abnormal situations that may occur on the backhaul (BH) link, such as radio link failure (RLF) or blockage, load fluctuations, etc.

In the case where an IAB network supports multi-hop and dual-connection networking, there may be multiple transmission paths between the UE and the IAB donor. A transmission path may include multiple nodes, such as a UE, one or more IAB nodes, and an IAB donor (if the IAB donor is in the form of separate CU and DU, it may also contain an IAB donor-DU and IAB donor-CU). Each IAB node may treat the neighboring node that provides backhaul services for it as a parent node (or parent IAB node), and each IAB node can be regarded as a child node (or child IAB node) of its parent node.

FIG. 1 illustrates a schematic diagram of a wireless communication system 100 in accordance with some embodiments of the present disclosure.

As shown in FIG. 1, the wireless communication system 100 may include some base stations (e.g., IAB donor 110A and IAB donor 110B), some IAB nodes (e.g., IAB node 120A, IAB node 120B, and IAB node 120C), and some UEs (e.g., UE 130A and UE 130B). Although a specific number of UEs, IAB nodes, and IAB donors are depicted in FIG. 1, it is contemplated that any number of UEs, IAB nodes, and IAB donors may be included in the wireless communication system 100.

Each of IAB donor 110A, IAB donor 110B, IAB node 120A, IAB node 120B, and IAB node 120C may be directly connected to one or more IAB node(s) in accordance with some other embodiments of the present disclosure. Each of IAB donor 110A, IAB donor 110B, IAB node 120A, IAB node 120B, and IAB node 120C may be directly connected to one or more UEs in accordance with some other embodiments of the present disclosure.

UE 130A and UE 130B may be any type of device configured to operate and/or communicate in a wireless environment. For example, UE 130A and UE 130B may include a computing device, such as a desktop computer, a laptop computer, a personal digital assistant (PDA), a tablet computer, a smart television (e.g., television connected to the Internet), a set-top box, a game console, a security system (including a security camera), a vehicle on-board computer, a network device (e.g., router, switch, and modem), or the like. According to some embodiments of the present disclosure, UE 130A and UE 130B may include a portable wireless communication device, a smart phone, a cellular telephone, a flip phone, a device having a subscriber identity module, a personal computer, a selective call receiver, or any other device that is capable of transmission and receiving communication signals on a wireless network. In some embodiments of the present disclosure, UE 130A and UE 130B may include wearable devices, such as smart watches, fitness bands, optical head-mounted displays, internet-of-things (IoT) devices, or the like. Moreover, UE 130A and UE 130B may be referred to as a subscriber unit, a mobile, a mobile station, a user, a terminal, a mobile terminal, a wireless terminal, a fixed terminal, a subscriber station, a user terminal, or a device, or described using other terminology used in the art.

IAB donors 110A and 110B may be in communication with a core network (not shown in FIG. 1). The core network (CN) may include a plurality of core network components, such as a mobility management entity (MME) (not shown in FIG. 1) or an access and mobility management function (AMF) (not shown in FIG. 1). The CNs may serve as gateways for the UEs to access a public switched telephone network (PSTN) and/or other networks (not shown in FIG. 1).

Wireless communication system 100 may be compatible with any type of network that is capable of transmission and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with 5G NR of the 3GPP protocol. For example, IAB donors 110A and 110B may transmit data using an orthogonal frequency division multiple (OFDM) modulation scheme on the DL. UE 130A and UE 130B may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

Persons skilled in the art should understand that as technology develops and advances, the terminologies described in the present disclosure may change, but should not affect or limit the principles and spirit of the present disclosure.

Referring to FIG. 1, IAB node 120A can be directly connected to IAB donors 110A and 110B, and IAB node 120B can be directly connected to IAB donor 110A. IAB donors 110A and 110B are parent nodes of IAB node 120A, and IAB donor 110A is a parent node of IAB node 120B. In other words, IAB nodes 120A and 120B are child IAB nodes of IAB donor 110A, and IAB node 120A is also a child IAB node of IAB donor 110B. IAB node 120C can reach IAB donor 110A by hopping through IAB node 120B. IAB node 120B is a parent IAB node of IAB node 120C. In other words, IAB node 120C is a child IAB node of IAB node 120B.

In some other embodiments of the present disclosure, an IAB node may be connected to IAB node 120C so it can reach IAB donor 110A by hopping through IAB node 120C and IAB node 120B. This IAB node and IAB node 120C may be referred to as the descendant IAB nodes of IAB node 120B.

UEs 130A and 130B can be connected to IAB nodes 120A and 120C, respectively. Uplink (UL) packets (e.g., data or signaling) from UE 130A or UE 130B can be transmitted to an IAB donor (e.g., IAB donor 110A or 110B) via one or more IAB nodes, and then transmitted by the IAB donor to a mobile gateway device (such as the user plane function (UPF) in the 5GC). Downlink (DL) packets (e.g., data or signaling) can be transmitted from the IAB donor (e.g., IAB donor 110A or 110B) after being received by the gateway device, and then transmitted to UE 130A or 130B through one or more IAB nodes.

For example, referring to FIG. 1, UE 130A may transmit UL data to IAB donor 110A or 110B or receive DL data therefrom via IAB node 120A. UE 130B may transmit UL data to IAB donor 110A or receive DL data therefrom via IAB node 120C and IAB node 120B.

In an IAB deployment such as the wireless communication system 100, the radio link between an IAB donor (e.g., IAB donor 110A or 110B in FIG. 1) and an IAB node or between two IAB nodes may be referred to as a backhaul link (BL). The radio link between an IAB donor (e.g., IAB donor 110A or 110B in FIG. 1) and a UE or between an IAB node and a UE may be referred to as an access link (AL). For example, in FIG. 1, radio links 140A to 140D are BLs and radio links 150A and 150B are ALs.

A protocol layer, the backhaul adaptation protocol (BAP) layer, located above the radio link control (RLC) layer is introduced in an IAB system, and can be used to realize packet routing, bearer mapping and flow control on the wireless backhaul link.

In some embodiments of the present disclosure, for BAP routing in an IAB network, each UL packet or DL packet on the BH link may be mapped to a specific BAP routing ID, which may be included in the BAP header. The BAP routing ID may include a BAP address which indicates the BAP address of a destination node in the BH link. The destination nodes of a DL BH link and a UL BH link may be an access IAB node and the DU of an IAB donor, respectively. The BAP routing ID may also include a path ID which indicates the routing path terminated the destination node.

An F1 interface may be established between an IAB node (e.g., the DU part of the IAB node) and an IAB donor (e.g., IAB donor-CU). The F1 interface may support both a user plane protocol (e.g., F1-U) and a control plane protocol (e.g., F1-C). The user plane protocol of the F1 interface may include one or more of a general packet radio service (GPRS) tunneling protocol user plane (GTP-U), user datagram protocol (UDP), internet protocol (IP) and other protocols. The control plane protocol of the F1 interface may include one or more of an F1 application protocol (F1AP), stream control transport protocol (SCTP), IP, and other protocols.

Through the control plane of the F1 interface, an IAB node and an IAB donor can perform, for example, interface management, IAB-DU management, and UE context-related configuration. Through the user plane of the F1 interface, an IAB node and an IAB donor can perform, for example, user plane data transmission and downlink transmission status feedback functions.

Figure 2:
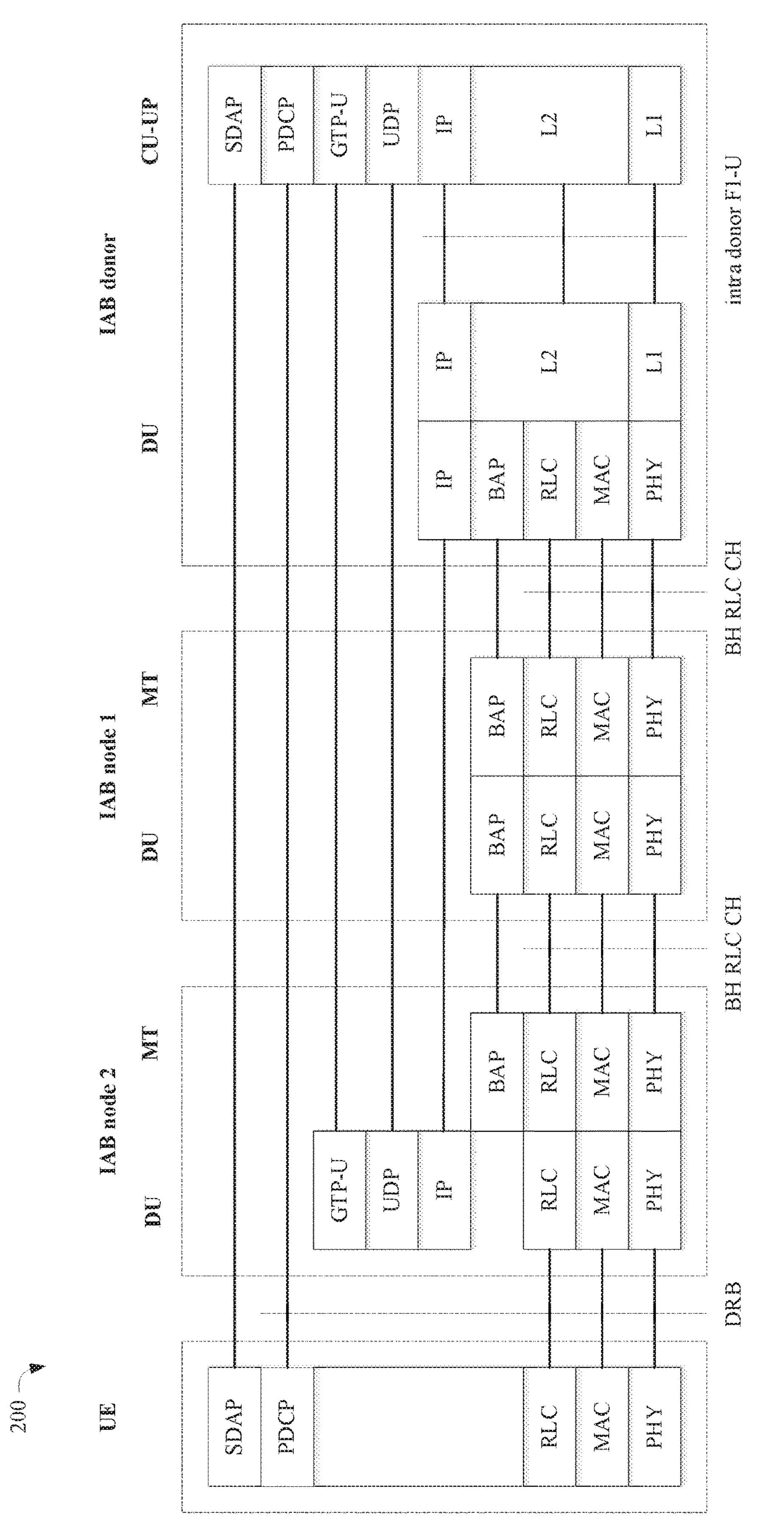
FIG. 2 illustrates an example block diagram of a protocol stack for an IAB network in accordance with some embodiments of the present disclosure.
Figure 3:
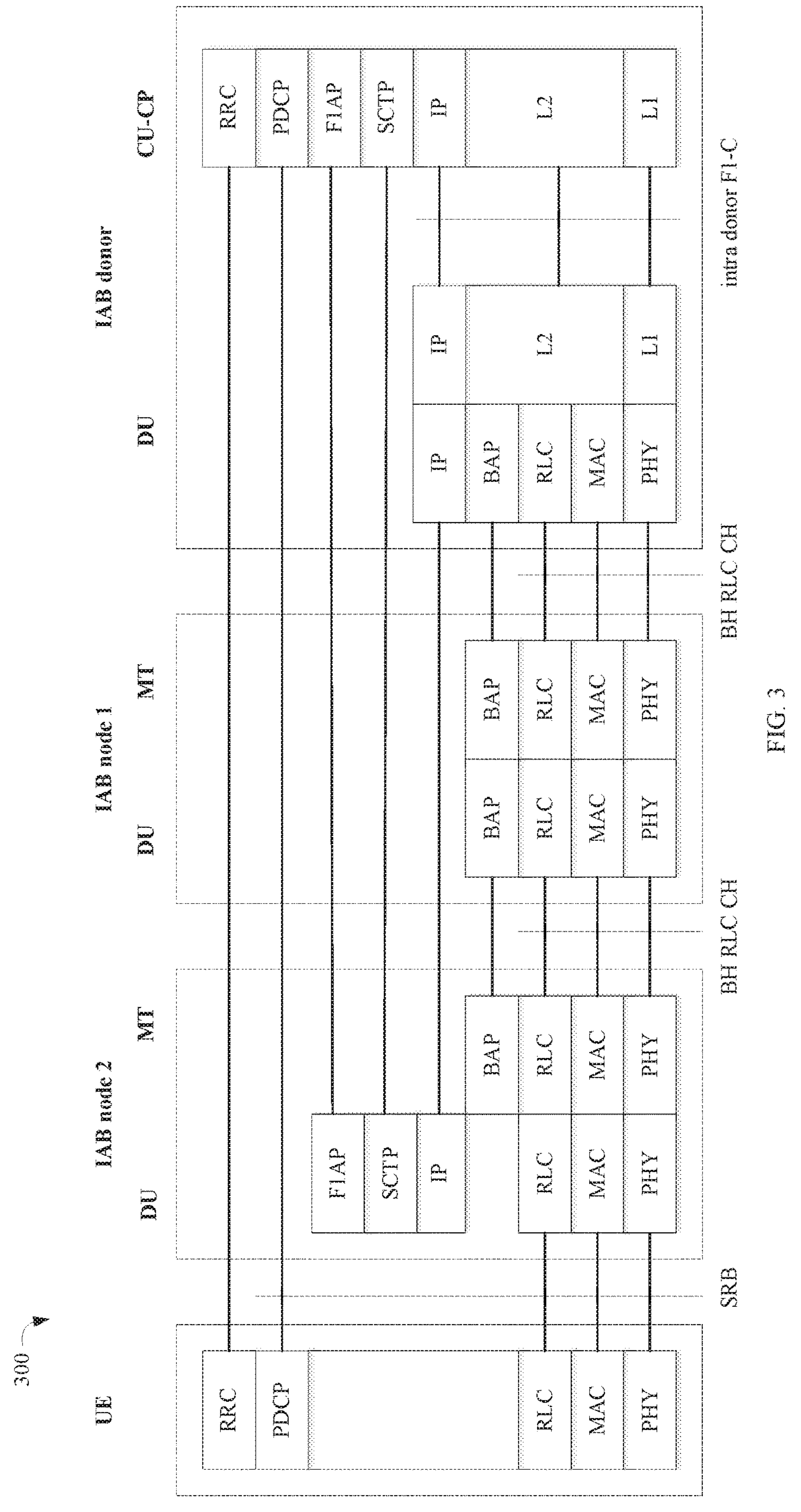
FIG. 3 illustrates an example block diagram of a protocol stack for an IAB network in accordance with some embodiments of the present disclosure.

FIG. 2 illustrates an example block diagram of a user plane (UP) protocol stack 200 for an IAB network according to some embodiments of the present disclosure. FIG. 3 illustrates an example block diagram of a control plane (CP) protocol stack 300 for an IAB network according to some embodiments of the present disclosure. In FIGS. 2 and 3, a UE may be connected to an IAB donor via IAB node 2 and IAB node 1.

Referring to FIG. 2, the UP protocol stack of the UE may include a service data adaptation protocol (SDAP) layer, a packet data convergence protocol (PDCP) layer, a radio link control (RLC) layer, a medium access control (MAC) layer, and a physical (PHY) layer. The UP protocol stack of the DU of IAB node 2 may include a GTP-U layer, a UDP layer, an IP layer, an RLC layer, a MAC layer, and a PHY layer. The UP protocol stack of the MT of IAB node 2 or the DU or MT of IAB node 1 may include a BAP layer, an RLC layer, a MAC layer, and a PHY layer. The UP protocol stack of the DU of the IAB donor may include an IP layer, a BAP layer, an RLC layer, a MAC layer, and a PHY layer, where the PHY layer belongs to layer 1 (L1), and the BAP layer, the RLC layer, and the MAC layer belong to layer 2 (L2). The protocol stack of the CU-UP of the IAB donor may include a GTP-U layer, a UDP layer, an IP layer, a SDAP layer, a PDCP layer, a L2 layer(s), and a L1 layer.

Referring to FIG. 3, the CP protocol stack of the UE may include a radio resource control (RRC) layer, a PDCP layer, an RLC layer, a MAC) layer, and a physical (PHY) layer. The CP protocol stack of the DU of IAB node 2 may include an F1AP layer, an SCTP layer, an IP layer, an RLC layer, a MAC layer, and a PHY layer. The CP protocol stack of the MT of IAB node 2 or the DU or MT of IAB node 1 may include a BAP layer, an RLC layer, a MAC layer, and a PHY layer. The CP protocol stack of the DU of the IAB donor may include an IP layer, a BAP layer, an RLC layer, a MAC layer, and a PHY layer, where the PHY layer belongs to L1, and the BAP layer, the RLC layer, and the MAC layer belong to L2. The protocol stack of the CU-CP of the IAB donor may include an RRC layer, a PDCP layer, an F1AP layer, an SCTP layer, an IP layer, a L2 layer(s), and a L1 layer.

The protocol stacks shown in FIGS. 2 and 3 are only for illustrative purpose. For example, the sequences of some of the protocol layers in the protocol stacks of FIGS. 2 and 3 may be rearranged for illustrative purpose. For example, although the SDAP and PDCP layers belong to L2, they are shown above the GTP—U layer, the UDP layer and the IP layer in the protocol stack of the CU-UP of the IAB donor in FIG. 2.

Various resource allocation approaches and multiplexing schemes may be applied to an IAB network.

For example, a slot format for an IAB-DU or an IAB-MT may include downlink symbols, uplink symbols, and flexible symbols. For example, for each serving cell of an IAB-MT, the IAB-MT can be provided an indication for a slot format over a number of slots by a higher layer (e.g., RRC layer) parameter such as tdd-UL-DL-Configuration-Dedicated-IAB-MT. For each serving cell of an IAB-DU, the IAB-DU can be provided an indication for a slot format over a number of slots by a higher layer parameter such as IAB-DU-Resource-Configuration.

With reference to slots of an IAB-DU serving cell, a symbol in a slot of an IAB-DU serving cell can be configured to be of hard, soft, or not available type. When a downlink, uplink, or flexible symbol is configured as hard, the IAB-DU serving cell can respectively transmit, receive, or either transmit or receive in the symbol. In some examples, when a downlink, uplink, or flexible symbol is configured as soft, the IAB-DU can respectively transmit, receive or either transmit or receive in the symbol only when:

- the IAB-MT does not transmit or receive in the symbol;
- the IAB-MT would transmit or receive in the symbol, and the transmission or reception in the symbol is not changed due to a use of the symbol by the IAB-DU; or
- the IAB-MT detects a certain DCI format (e.g., DCI format 2_5 as defined in 3GPP specification) with an available indication (AI) index field value indicating the soft symbol as available.

When a symbol is configured as not available, the IAB-DU neither transmits nor receives in the symbol.

In some embodiments of the present disclosure, an IAB node can simultaneously execute the transmission and reception operations of the IAB-MT and the IAB-DU according to different capabilities, and can support various multiplexing operation combinations, such as IAB-MT and IAB-DU transmission, IAB-MT and IAB-DU reception, IAB-MT reception and IAB-DU transmission, and IAB-MT transmission and IAB-DU reception.

For example, a "Multiplexing info" information element (IE) defined in 3GPP specifications as shown below may contain information about the multiplexing capabilities between the IAB-DU's cell and the cells configured on the collocated IAB-MT.

| IE/Group Name | Presence | Range | IE type and reference | Semantics description |
|---|---|---|---|---|
| IAB-MT Cell List | | 1 | | |
| >IAB-MT Cell Item | | 1 . . . <maxnoofServingCells> | | |
| >>NR Cell Identity | M | | BIT STRING (SIZE(36)) | Cell identity of a serving cell configured for a collocated IAB-MT. |
| >>DU_RX/MT_RX | M | | ENUMERATED (supported, not supported) | An indication of whether the IAB-node supports simultaneous reception at its DU and MT side. |
| >>DU_TX/MT_TX | M | | ENUMERATED (supported, not supported) | An indication of whether the IAB-node supports simultaneous transmission at its DU and MT side. |
| >>DU_TX/MT_RX | M | | ENUMERATED (supported, not supported) | An indication of whether the IAB-node supports simultaneous transmission at its DU and reception at its MT side. |
| >>DU_RX/MT_TX | M | | ENUMERATED (supported, not supported) | An indication of whether the IAB-node supports simultaneous reception at its DU and transmission at its MT side. |

In some scenarios, an IAB node can be migrated (or handed over) from one IAB donor (source IAB donor) to another IAB donor (target IAB donor). For example, referring back to FIG. 1, IAB node 120C or IAB node 120B may be migrated from IAB donor 110A to IAB donor 110B. During the migration, only the MT of the IAB node may be migrated to the target IAB donor. The DU of the IAB node, the descendant IAB node(s) of the IAB node, and UE(s) connected to the IAB node and the descendant IAB node(s) may still be anchored at the source IAB donor. That is, the anchor nodes for the logical F1 connections may not change. In some embodiments of the present disclosure, the F1 transport path for the DU of the IAB node and the DU(s) of the descendant IAB node(s) of the IAB node may need to be migrated from the source path to the target path.

Figure 4:
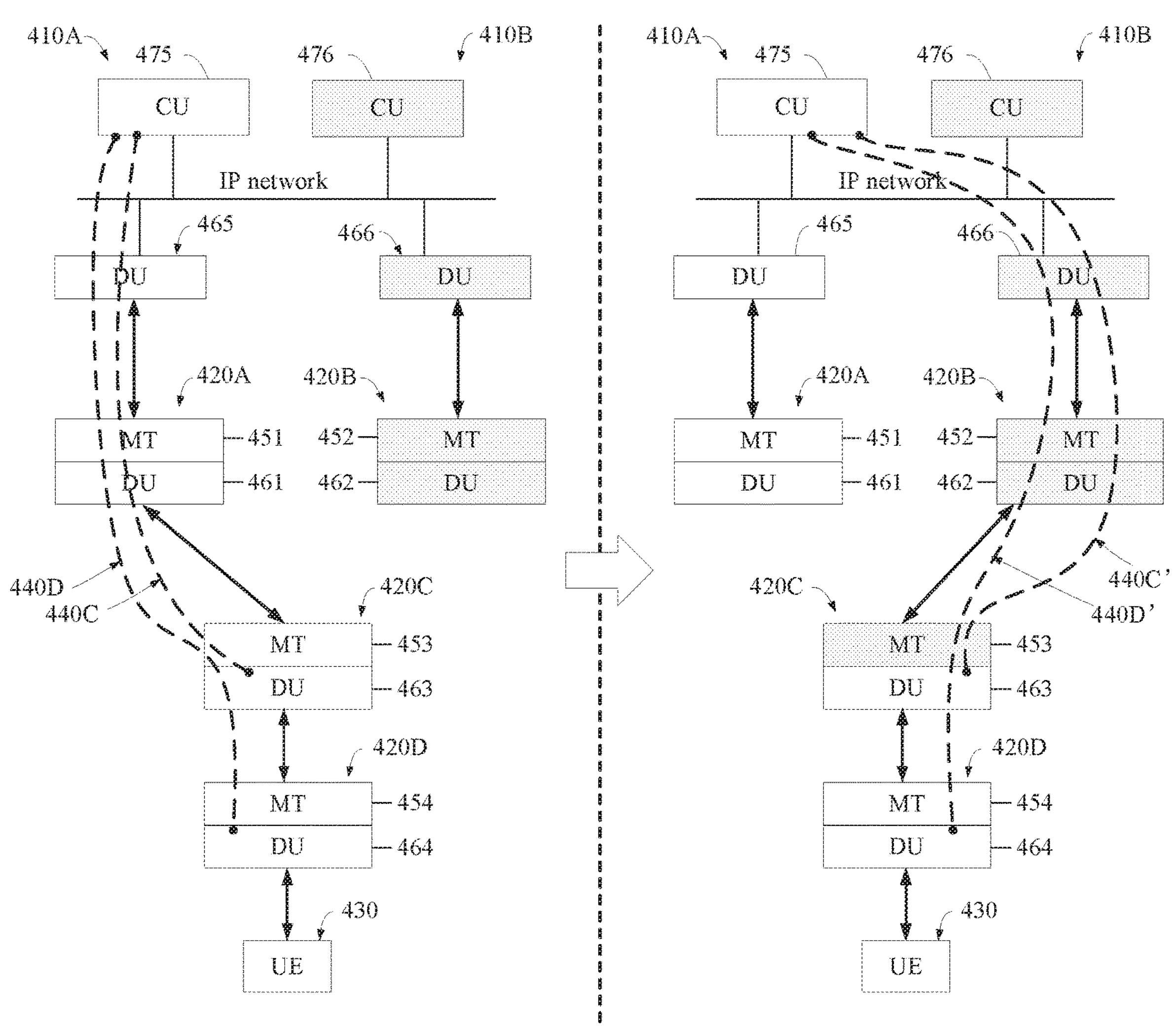
FIG. 4 illustrates a schematic diagram of IAB node migration in accordance with some embodiments of the present disclosure.

FIG. 4 illustrates a schematic diagram of IAB node migration in accordance with some embodiments of the present disclosure. Details described in all of the foregoing embodiments of the present disclosure are applicable for the embodiments shown in FIG. 4.

In FIG. 4, IAB donor 410A may include CU 475 and DU 465, and IAB donor 410B may include CU 476 and DU 466. IAB node 420A may be directly connected to IAB donor 410A and may include MT 451 and DU 461. IAB node 420B may be directly connected to IAB donor 410B and may include MT 452 and DU 462. IAB node 420C may include MT 453 and DU 463. IAB node 420D may be connected to IAB node 420C, and may include MT 454 and DU 464, and UE 430 may be connected to IAB node 420D. IAB node 420D may be referred to as an access IAB node of UE 430.

The left part of FIG. 4 shows an IAB network before the migration of IAB node 420C. In the left part of FIG. 4, IAB node 420C can reach IAB donor 410A via IAB node 420A, and IAB node 420D can reach IAB donor 410A via IAB node 420C and IAB node 420A. Both MT 453 and DU 463 of IAB node 420C may be anchored at CU 476 of IAB donor 410A. 440C denotes an F1 signaling flow between DU 463 and CU 475 and 440D denotes an F1 signaling flow between DU 464 and CU 475.

The right part of FIG. 4 shows an IAB network after the migration of IAB node 420C, in which only MT 453 of IAB node 420C is migrated from IAB donor 410A to IAB donor 410B and DU 463 of IAB node 420C is still under the control of IAB donor 410A. In other words, MT 453 is anchored at CU 476 and DU 463 is still anchored at CU 475. 440C' denotes an F1 signaling flow between DU 463 and CU 475 and 440D' denotes an F1 signaling flow between DU 464 and CU 475.

Several issues may need to be resolved in the topology of the right part of FIG. 4.

One issue is that resource collision may occur between MT 453 and DU 463 of IAB node 420C. For example, there may be some resource configuration issues during the migration of IAB node 420C and when the topology of the right part of FIG. 4 becomes stable.

Another issue that needs to be solved is how to configure the routing and bearing mapping to MT 453 of IAB node 420C. According the known mechanism for routing and bearing mapping configuration of an IAB-MT, the routing and bearing mapping of an IAB-MT may be configured by an F1AP message between the CU of an IAB donor and collocated IAB-DU, and the collocated IAB-DU may deliver the configuration to the corresponding IAB-MT through an inner interface within the IAB node. Since DU 463 and MT 453 are under the control of different IAB donors or CUs, the known mechanism may not be applicable for MT 453.

Yet another issue that needs to be solved is after the migration of MT 453 of IAB node 420C, whether DU 463 of IAB node 420C should be migrated or not.

Embodiments of the present disclosure provide solutions to enhance the migration of an IAB node, which can solve the above issues. More details on the embodiments of the present disclosure will be illustrated in the following text in combination with the appended drawings.

Figure 5:
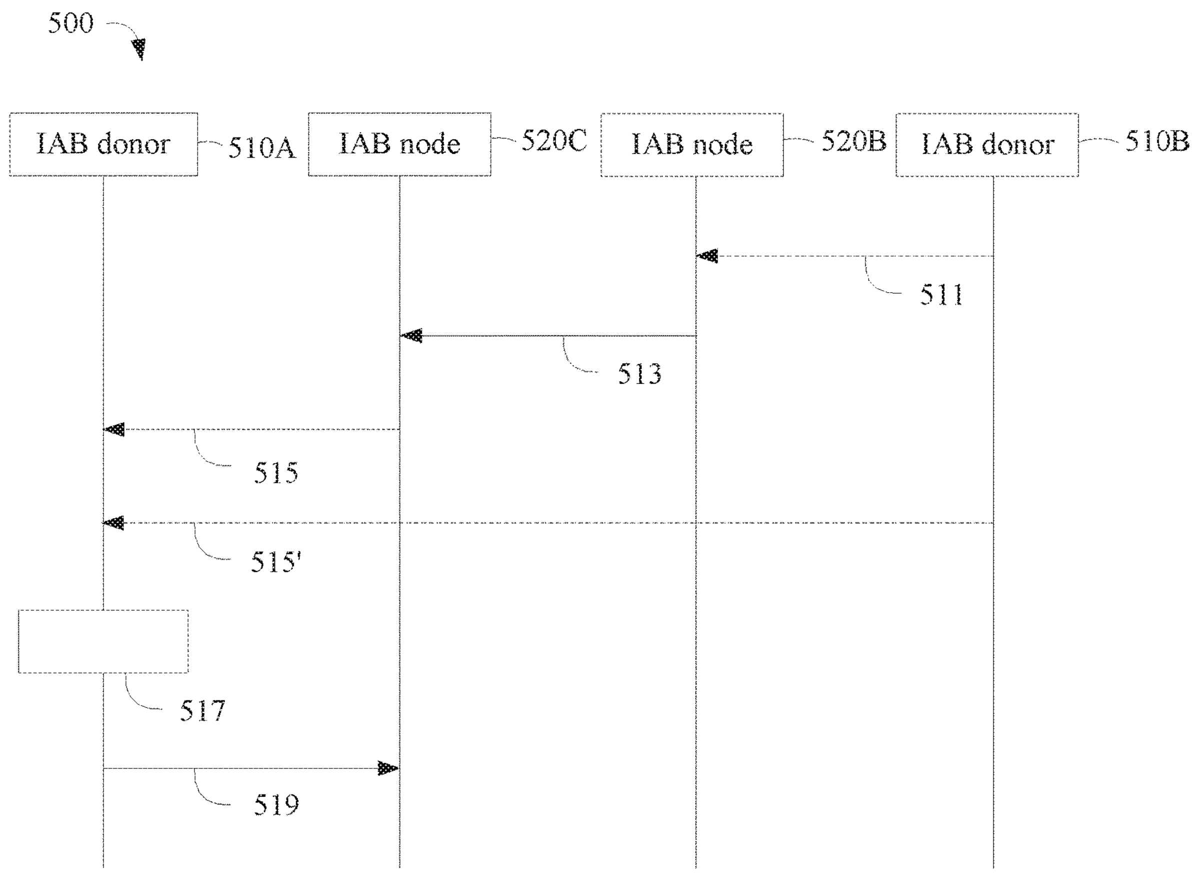
FIG. 5 illustrates a flow chart of an exemplary procedure of wireless communications in accordance with some embodiments of the present disclosure.

FIG. 5 illustrates a flow chart of an exemplary procedure 500 of wireless communications in accordance with some embodiments of the present disclosure. The exemplary procedure 500 shows a procedure of updating resource configuration for the DU of an IAB node according to the resource configuration for the MT of the IAB node.

In some examples, IAB node 520B and IAB node 520C may function as IAB node 420B and IAB node 420C in FIG. 4, respectively. IAB donor 510A and IAB donor 510B may function as IAB donor 410A and IAB donor 410B in FIG. 4, respectively.

Details described in all of the foregoing embodiments of the present disclosure are applicable for the embodiments shown in FIG. 5. It should be appreciated by persons skilled in the art that the sequence of the operations in exemplary procedure 500 may be changed and some of the operations in exemplary procedure 500 may be eliminated or modified, without departing from the spirit and scope of the disclosure.

Referring to FIG. 5, in some embodiments of the present disclosure, IAB node 520C may have been handed over from IAB donor 510A to IAB donor 510B. After the handover procedure, the MT of IAB node 520C may be connected to IAB donor 510B and the DU of IAB node 520C may be connected to IAB donor 510A. IAB node 520B may be connected to IAB donor 510B and may be the parent node of IAB node 520C.

In some cases, resource collision may occur between MT and DU of IAB node 520C. For example, when IAB node 520C only supports half duplex, the resource configuration for the MT of IAB node 520C and the DU of IAB node 520C should meet the limitation of the half duplex. However, since the MT of IAB node 520C has migrated (or is migrating) to IAB donor 510B from IAB donor 510A and the DU of IAB node 520C is still under the control of IAB donor 510A, the resource configuration of the DU of IAB node 520C and the resource configuration of the MT of IAB node 520C may be configured by different entities, which may cause a resource collision.

In operation 513, IAB node 520C (e.g., MT of IAB node 520C) may receive a resource configuration (MT resource configuration) for the MT of IAB node 520C from IAB node 520B.

The MT resource configuration may include time domain configuration, frequency domain configuration, or both. In some examples, the frequency domain configuration for the MT of IAB node 520C may include one or more of: a frequency band(s), a band combination(s), a combination of central frequency points and bandwidth, etc. In some examples, the time domain configuration for the MT of IAB node 520C may include one or more of: a system frame number, time domain duration, a slot format which indicates the downlink, uplink, flexible attribute of each subframe or each symbol, etc.

In some embodiments of the present disclosure, the MT resource configuration for IAB node 520C may be from IAB donor 510B (e.g., CU of IAB donor 510B). For example, in operation 511 (denoted by the dotted arrow as an option), IAB donor 510B may transmit the MT resource configuration to IAB node 520B, which may transmit the same configuration to IAB node 520C in operation 513.

In some other embodiments of the present disclosure, the timing for the reception of MT resource configuration may occur before the migration of the MT of IAB node 520C (e.g., during the handover procedure). In some cases, the MT resource configuration may be transmitted via a handover command. For example, IAB donor 510A may transparently transmit (e.g., without decoding) a handover command from IAB donor 510B to IAB node 520C. In another example, IAB donor 510A may decode the handover command, and thus obtain the MT resource configuration. In this example, operation 515 or operation 515' as described below may be eliminated.

In response to the MT resource reconfiguration of IAB node 520C, the resource configuration for the DU of IAB node 520C may need to be updated accordingly.

In some examples, in operation 515, in response to receiving the MT resource configuration, IAB node 520C (e.g., DU of IAB node 520C) may transmit the MT resource configuration to IAB donor 510A (e.g., CU of IAB donor 510A). For example, IAB node 520C may transmit the MT resource configuration to IAB donor 510A right after the reception of the MT resource configuration. The MT resource configuration may be transmitted via an F1 interface (or via an F1AP message).

In some other examples, IAB donor 510B may transmit the MT resource configuration to IAB donor 510A. The timing for transmitting the MT resource configuration may be up to the implementation of IAB donor 510B.

For example, in operation 515' (denoted by the dotted arrow as an alternative to operation 515), IAB donor 510B (e.g., CU of IAB donor 510B) may transmit the MT resource configuration to IAB donor 510A (e.g., CU of IAB donor 510A) via Xn interface signaling therebetween. In yet other examples, IAB donor 510B (e.g., CU of IAB donor 510B) may transmit the MT resource configuration to IAB donor 510A (e.g., CU of IAB donor 510A) via NG interface signaling relayed by the core network (not shown in FIG. 5). For example, IAB donor 510B may transmit the MT resource configuration to the core network, which may transmit the same to IAB donor 510A.

In operation 517, based on the received MT resource configuration, IAB donor 510A (e.g., CU of IAB donor 510A) may determine an updated resource configuration (DU resource configuration) for the DU of IAB node 520C.

The DU resource configuration may include time domain configuration, frequency domain configuration, or both. In some examples, the frequency domain configuration for the DU of IAB node 520C may include one or more of: a frequency band(s), a band combination(s), a combination of central frequency points and bandwidth, etc. In some examples, the time domain configuration for the DU of IAB node 520C may include one or more of: a system frame number, time domain duration, a slot format which indicates the downlink, uplink, flexible attribute of each subframe or each symbol, the Hard or Soft or Not Available attribute of each symbol, etc.

In operation 519, IAB donor 510A (e.g., CU of IAB donor 510A) may configure the DU resource configuration to the DU of IAB node 520C.

Figure 6:
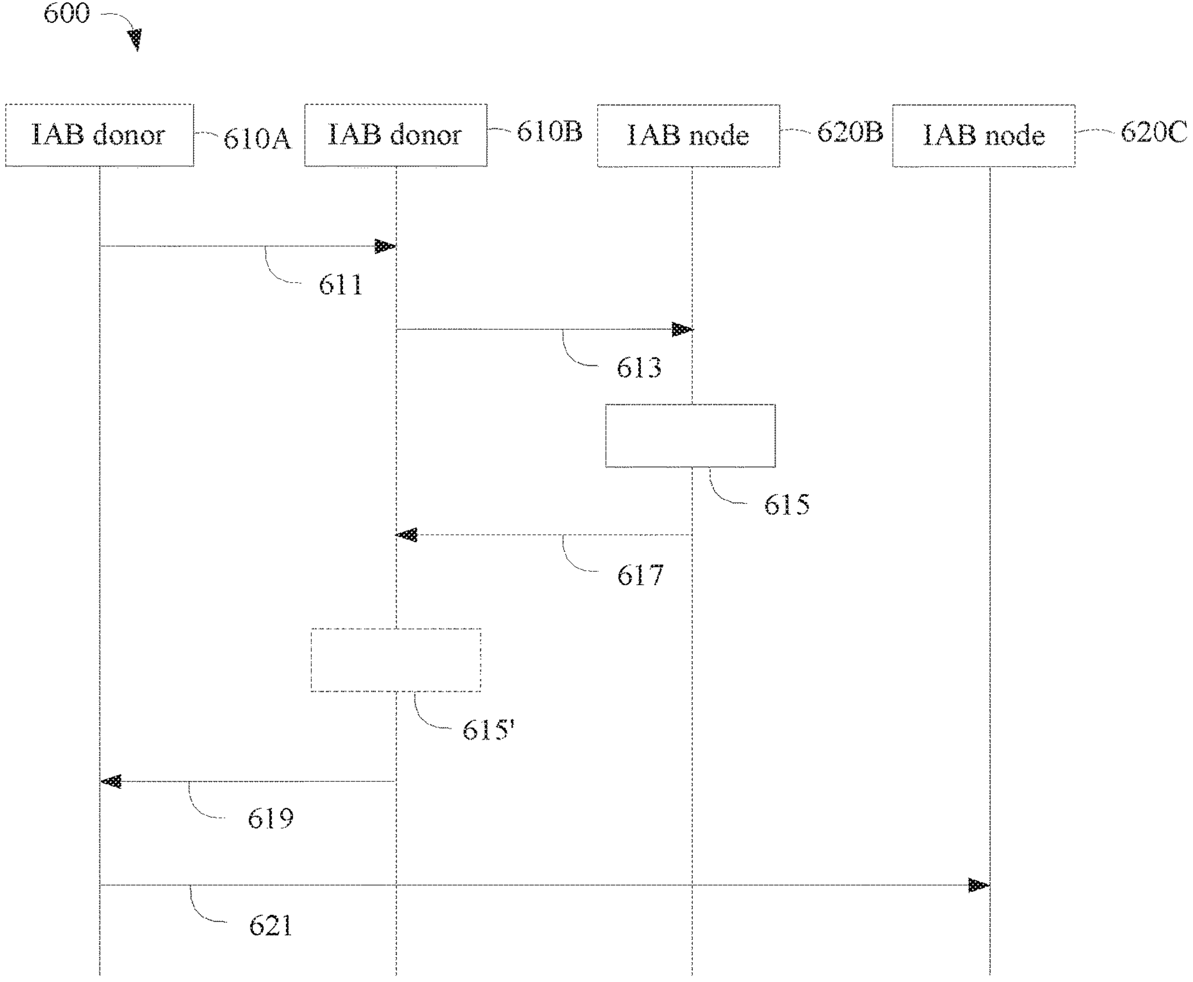
FIG. 6 illustrates a flow chart of an exemplary procedure of wireless communications in accordance with some embodiments of the present disclosure.

FIG. 6 illustrates a flow chart of an exemplary procedure 600 of wireless communications in accordance with some embodiments of the present disclosure. The exemplary procedure 600 shows a procedure of updating resource configuration for the MT of an IAB node according to the resource configuration for the DU of the IAB node.

In some examples, IAB node 620B and IAB node 620C may function as IAB node 420B and IAB node 420C in FIG. 4, respectively. IAB donor 610A and IAB donor 610B may function as IAB donor 410A and IAB donor 410B in FIG. 4, respectively.

Details described in all of the foregoing embodiments of the present disclosure are applicable for the embodiments shown in FIG. 6. It should be appreciated by persons skilled in the art that the sequence of the operations in exemplary procedure 600 may be changed and some of the operations in exemplary procedure 600 may be eliminated or modified, without departing from the spirit and scope of the disclosure.

The exemplary procedure 600 may be performed when IAB node 620C is handing over from IAB donor 610A to IAB donor 610B. After the handover procedure, the MT of IAB node 620C may be connected to IAB donor 610B and the DU of IAB node 620C may be connected to IAB donor 610A. IAB node 620B may be connected to IAB donor 610B and may be the parent node of IAB node 620C.

Similar to FIG. 5, resource collision may occur between MT and DU of IAB node 620C. During (or after) the migration of the MT of IAB node 620C, the resource configuration for the MT of IAB node 620C may be updated to be compatible with the resource configuration for the DU of IAB node 620C.

In some examples, in operation 611, IAB donor 610A (e.g., CU of IAB donor 610A) may transmit a resource configuration (DU resource configuration) for the DU of IAB node 620C to IAB donor 610B (e.g., CU of IAB donor 610B) via Xn interface signaling therebetween.

In some other examples, IAB donor 610A (e.g., CU of IAB donor 610A) may transmit the DU resource configuration to IAB donor 610B (e.g., CU of IAB donor 610B) via NG interface signaling relayed by the core network (not shown in FIG. 6). For example, IAB donor 610A may transmit the DU resource configuration to the core network, which may transmit the same to IAB donor 610B.

The timing for the transmission of DU resource configuration may occur before the migration of the MT of IAB node 620C (e.g., during the handover procedure). For instance, the DU resource configuration may be transmitted via a handover required message and a handover request message. For example, IAB donor 610A may transmit a handover required message carrying the DU resource configuration to the core network, which may transmit a handover request message carrying the DU resource configuration to IAB donor 610B.

The DU resource configuration may include time domain configuration, frequency domain configuration, or both. The descriptions regarding the DU resource configuration, time domain configuration, and frequency domain configuration as stated above may apply here.

Moreover, to facilitate the update of the MT resource configuration of IAB node 620C so that is can be compatible with the DU resource configuration of IAB node 620C, IAB donor 610B or the parent node (e.g., IAB node 620B) of IAB node 620C may need to know the multiplexing information (e.g., multiplexing capability, duplex mode, or both) of the IAB node 620C. Therefore, IAB donor 610A (e.g., CU of IAB donor 610A) may further transmit the multiplexing information to IAB donor 610B (e.g., CU of IAB donor 610B). The multiplexing information and the DU resource configuration may be transmitted in the same or separate signaling messages.

In some examples, the multiplexing information may indicate whether IAB node 620C supports simultaneous transmission or reception at its MT and DU, for example, "MT Tx & DU Tx," "MT Tx & DU Rx," "MT Rx & DU Tx" and "MT Rx & DU Rx." "MT Tx & DU Tx" refers to simultaneous transmission at MT and transmission at DU, "MT Tx & DU Rx" refers to simultaneous transmission at MT and reception at DU, "MT Rx & DU Tx" refers to simultaneous reception at MT and transmission at DU, and "MT Rx & DU Rx" refers to simultaneous reception at MT and reception at DU.

IAB donor 610B or IAB node 620B may generate the MT resource configuration of IAB node 620C that is compatible with the DU resource configuration.

For example, in operation 613, IAB donor 610B (e.g., CU of IAB donor 610B) may transmit the MT resource configuration (as well as the multiplexing information, if any) to IAB node 620B (e.g., DU of IAB donor 610B) via an F1 interface. In operation 615, IAB node 620B (e.g., DU of IAB donor 610B) may determine the MT resource configuration for the IAB node 620C based on the DU resource configuration (as well as the multiplexing information, if any). In operation 617, IAB node 620B (e.g., DU of IAB donor 610B) may transmit the determined MT resource configuration to IAB donor 610B (e.g., CU of IAB donor 610B).

In another example, in operation 615' (denoted by the dotted arrow as an alternative to operations 613-617), IAB donor 610B (e.g., CU of IAB donor 610B) may determine the MT resource configuration for IAB node 620C based on the DU resource configuration (as well as the multiplexing information, if any).

In operation 619, IAB donor 610B (e.g., CU of IAB donor 610B) may transmit the MT resource configuration to IAB donor 610A (e.g., CU of IAB donor 610B). In operation 621, IAB donor 610A (e.g., CU of IAB donor 610B) may transmit the MT resource configuration to IAB node 620C (e.g., MT of IAB node 620C). In some examples, the MT resource configuration may be carried in a handover command.

Figure 7:
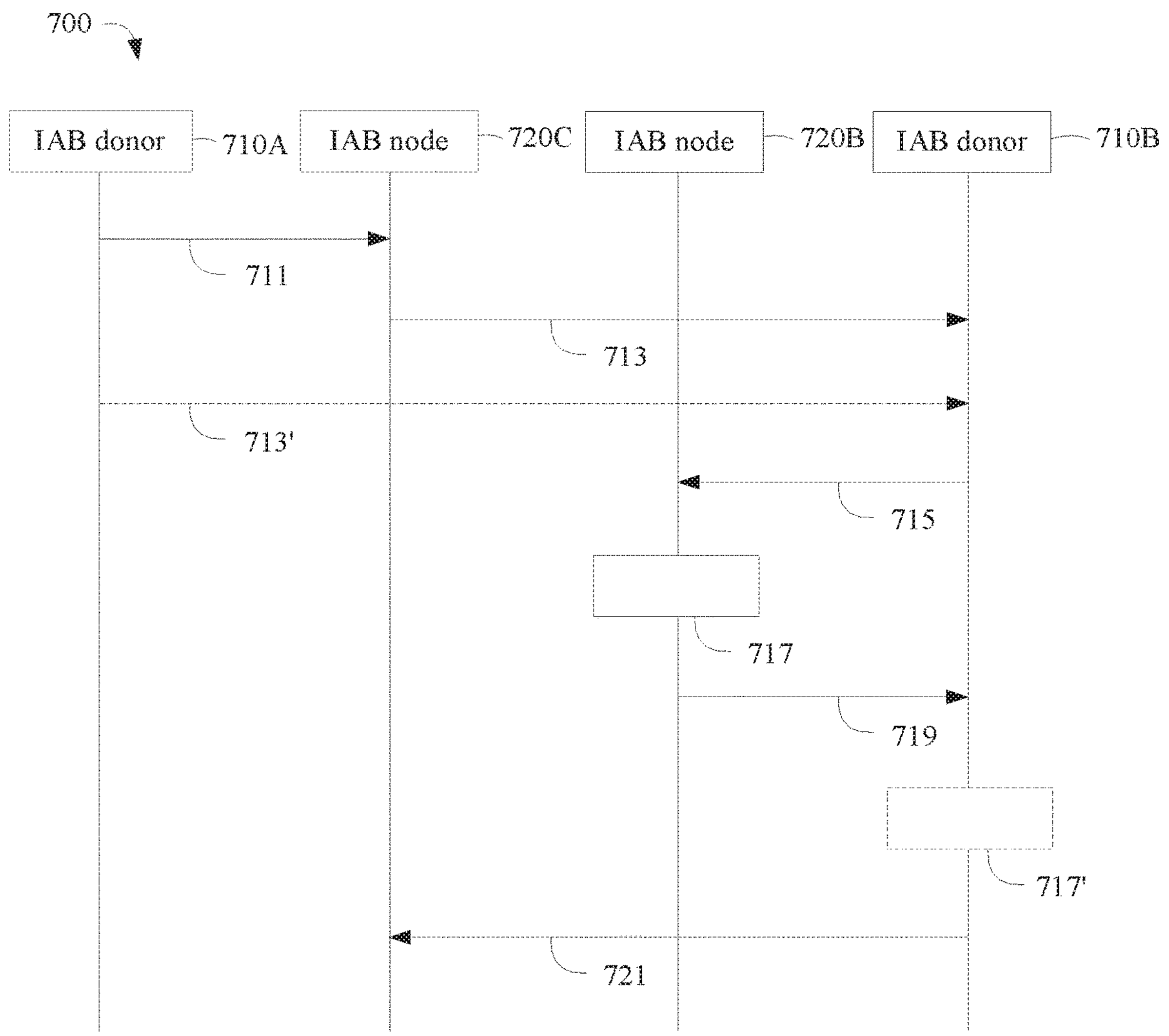
FIG. 7 illustrates a flow chart of an exemplary procedure of wireless communications in accordance with some embodiments of the present disclosure.

FIG. 7 illustrates a flow chart of an exemplary procedure 700 of wireless communications in accordance with some embodiments of the present disclosure. The exemplary procedure 700 shows a procedure of updating resource configuration for the MT of an IAB node according to the resource configuration for the DU of the IAB node.

In some examples, IAB node 720B and IAB node 720C may function as IAB node 420B and IAB node 420C in FIG. 4, respectively. IAB donor 710A and IAB donor 710B may function as IAB donor 410A and IAB donor 410B in FIG. 4, respectively.

Details described in all of the foregoing embodiments of the present disclosure are applicable for the embodiments shown in FIG. 7. It should be appreciated by persons skilled in the art that the sequence of the operations in exemplary procedure 700 may be changed and some of the operations in exemplary procedure 700 may be eliminated or modified, without departing from the spirit and scope of the disclosure.

The exemplary procedure 700 may be performed after handing over IAB node 720C from IAB donor 710A to IAB donor 710B. After the handover procedure, the MT of IAB node 720C may be connected to IAB donor 710B and the DU of IAB node 720C may be connected to IAB donor 710A. IAB node 720B may be connected to IAB donor 710B and may be the parent node of IAB node 720C. After the handover (or migration) of the MT of IAB node 720C, the resource configuration for the MT of IAB node 720C may be updated to be compatible with the update of the resource configuration for the DU of IAB node 720C, so as to meet the limitation of the duplex and avoid resource collision.

For example, in operation 711, IAB donor 710A (e.g., CU of IAB donor 710A) may transmit a resource configuration (DU resource configuration) for the DU of IAB node 720C to IAB node 720C (e.g., DU of IAB node 720C) via an F1AP message. The description for the DU resource configuration as stated above may apply here. In response to the F1AP message, the DU of IAB node 720C may update its resource configuration.

In some examples, in operation 713, IAB node 720C (e.g., MT of IAB node 720C) may transmit the DU resource configuration for IAB node 720C to IAB donor 710B (e.g., CU of IAB donor 710B) via RRC signaling. For example, IAB node 720C may transmit the DU resource configuration to IAB donor 710B right after the reception of the same.

In some other examples, in operation 713' (denoted by the dotted arrow as an alternative to operation 713), IAB donor 710A (e.g., CU of IAB donor 710A) may transmit the DU resource configuration for IAB node 720C to IAB donor 710B (e.g., CU of IAB donor 710B) via Xn interface signaling therebetween. In yet other examples, IAB donor 710A (e.g., CU of IAB donor 710A) may transmit the DU resource configuration for IAB node 720C to IAB donor 710B (e.g., CU of IAB donor 710B) via NG interface signaling relayed by the core network (not shown in FIG. 7).

Moreover, to facilitate the update of the MT resource configuration of IAB node 720C so that is can be compatible with the DU resource configuration of IAB node 720C, IAB donor 710B or the parent node (e.g., IAB node 720B) of IAB node 720C may need to know the multiplexing information (e.g., multiplexing capability, duplex mode, or both) of the IAB node 720C. Therefore, IAB node 720C (e.g., MT of IAB node 720C) or IAB donor 710A (e.g., CU of IAB donor 710A) may further transmit the multiplexing information to IAB donor 710B (e.g., CU of IAB donor 710B). The multiplexing information and the DU resource configuration may be transmitted in the same or separate signaling messages. The description for the multiplexing information as stated above may apply here.

IAB donor 710B or IAB node 720B may generate the MT resource configuration of IAB node 720C that is compatible with the DU resource configuration.

For example, in operation 715, IAB donor 710B (e.g., CU of IAB donor 710B) may transmit the DU resource configuration (as well as the multiplexing information, if any) to IAB node 720B (e.g., DU of IAB donor 710B) via an F1 interface (e.g., an F1AP message). In operation 717, IAB node 720B (e.g., DU of IAB donor 710B) may determine the MT resource configuration for the IAB node 720C based on the DU resource configuration (as well as the multiplexing information, if any). In operation 719, IAB node 720B (e.g., DU of IAB donor 710B) may transmit the determined MT resource configuration to IAB donor 710B (e.g., CU of IAB donor 710B).

In another example, in operation 717' (denoted by the dotted arrow as an alternative to operations 715-719), IAB donor 710B (e.g., CU of IAB donor 710B) may determine the MT resource configuration for IAB node 720C based on the DU resource configuration (as well as the multiplexing information, if any).

In operation 721, IAB donor 710B (e.g., CU of IAB donor 710B) may transmit the MT resource configuration to IAB node 720C (e.g., MT of IAB node 720C) via RRC signaling.

Figure 8:
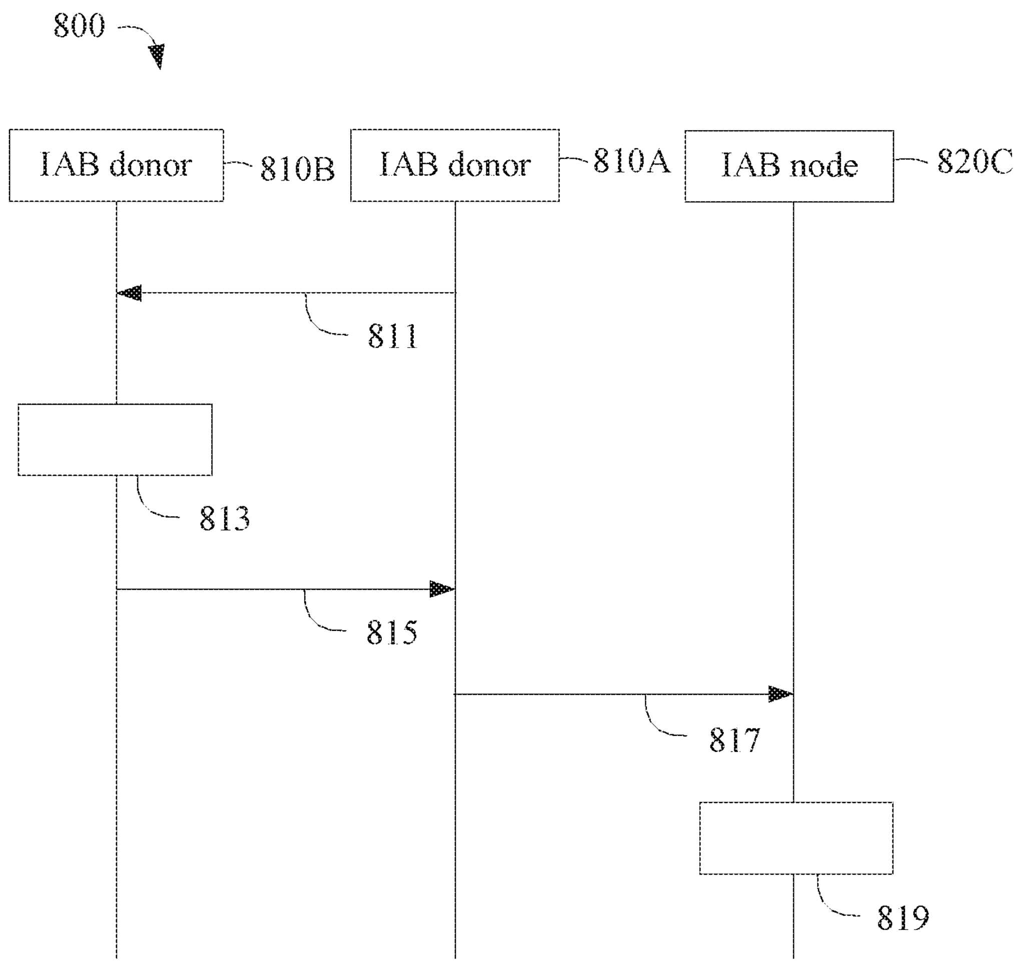
FIG. 8 illustrates a flow chart of an exemplary procedure of wireless communications in accordance with some embodiments of the present disclosure.

FIG. 8 illustrates a flow chart of an exemplary procedure 800 of wireless communications in accordance with some embodiments of the present disclosure. The exemplary procedure 800 shows a procedure for routing and bearing mapping configuration of an IAB node.

In some examples, IAB node 820C, IAB donor 810A and IAB donor 810B may function as IAB node 420C, IAB donor 410A and IAB donor 410B in FIG. 4, respectively.

Details described in all of the foregoing embodiments of the present disclosure are applicable for the embodiments shown in FIG. 8. It should be appreciated by persons skilled in the art that the sequence of the operations in exemplary procedure 800 may be changed and some of the operations in exemplary procedure 800 may be eliminated or modified, without departing from the spirit and scope of the disclosure.

The exemplary procedure 800 may be performed after handing over IAB node 820C from IAB donor 810A to IAB donor 810B. After the handover procedure, the MT of IAB node 820C may be connected to IAB donor 810B and the DU of IAB node 820C may be connected to IAB donor 810A. In the exemplary procedure 800, the UL routing and bearer mapping configuration for the MT of IAB node 820C may be generated by IAB donor 810B (e.g., CU of IAB donor 810B), and then transmitted to IAB donor 810A (e.g., CU of IAB donor 810A). IAB donor 810A (e.g., CU of IAB donor 810A) may transmit the configuration to IAB node 820C (e.g., the DU of IAB node 820C) via an F1AP message.

For example, in operation 811, IAB donor 810A (e.g., CU of IAB donor 810A) may transmit UL ingress traffic information associated with IAB node 820C to IAB donor 810B (e.g., CU of IAB donor 810B). The UL ingress traffic information may indicate an ingress channel of IAB node 820C or both the ingress channel of IAB node 820C and quality-of-service (QoS) information associated with the ingress channel.

In some examples, when IAB node 820C has an child IAB node, the UL ingress traffic information may indicate an ID of a UL ingress BH RLC channel (CH) between IAB node 820C and the child IAB node of IAB node 820C, or both the ID of the UL ingress BH RLC CH and the QoS information associated with the UL ingress BH RLC CH.

The QoS information associated with the UL ingress BH RLC CH may include at least one of the following for the UL ingress BH RLC CH: a guaranteed bit rate (GBR), an allocation and retention priority (ARP), an aggregate maximum bit rate (AMBR), and the like.

In some examples, when IAB node 820C plays the role of an access IAB node for a served UE (e.g., a UE directly connects IAB node 820C to access the network), the UL ingress traffic information may indicate the UL UP transport network layer (TNL) information, or both the UL UP TNL information, an ID of a data radio bearer (DRB) associated with the UL UP TNL information, and the QoS information associated with the DRB. The UL UP TNL information may include a GTP-U tunnel endpoint identifier (TEID) and at least one of a TNL address, a transport layer address, and a transport layer IP address.

In operation 813, IAB donor 810B (e.g., CU of IAB donor 810B) may generate a bearer mapping configuration associated with IAB node 820C, a UL routing configuration associated with IAB node 820C, or both. The configurations may be applied to the MT of IAB node 820C.

For example, IAB donor 810B can determine a corresponding UL egress BH RLC CH of IAB node 820C for each UL ingress BH RLC CH of IAB node 820C, and a corresponding UL egress BH RLC CH of IAB node 820C for each UL UP TNL information associated with IAB node 820C. IAB donor 810B can determine the UL routing configuration, path, strategy or any combination thereof which may include a BAP routing ID for each UL ingress BH RLC CH of IAB node 820C, and a BAP routing ID for each UL UP TNL information associated with IAB node 820C.

In some examples, the bearer mapping configuration and the UL routing configuration may be based on the received UL ingress traffic information.

In some examples, the bearer mapping configuration may indicate a mapping (bearer mapping #1) between a UL egress BH RLC CH (or its ID) between IAB node 820C and a parent node of IAB node 820C and a UL ingress BH RLC CH (or its ID). For example, for each UL ingress BH RLC CH between IAB node 820C and a corresponding child IAB node of IAB node 820C, the bearer mapping configuration may indicate a corresponding UL egress BH RLC CH (or its ID) between IAB node 820C and a parent node of IAB node 820C. Different UL ingress BH RLC CHs may correspond to the same or different UL egress BH RLC CHs.

In some examples, the bearer mapping configuration may indicate a mapping (bearer mapping #2) between a UL egress BH RLC CH (or its ID) between IAB node 820C and a parent node of IAB node 820C and the UL UP TNL information. For example, for each UL UP TNL information, the bearer mapping configuration may indicate a corresponding UL egress BH RLC CH between IAB node 820C and a parent node of IAB node 820C.

In some examples, the bearer mapping configuration may indicate both bearer mapping #1 and bearer mapping #2.

In some examples, the UL routing configuration may indicate a mapping (routing mapping #1) between a BAP routing ID and a UL ingress BH RLC CH (or its ID) between IAB node 820C and a child IAB node of IAB node 820C. For example, for each UL ingress BH RLC CH of IAB node 820C, the UL routing configuration may indicate a corresponding BAP routing ID.

In some examples, the UL routing configuration may indicate a mapping (routing mapping #2) between a BAP routing ID and the UL UP TNL information. For example, for each UL UP TNL information, the UL routing configuration may indicate a corresponding BAP routing ID.

In some examples, the UL routing configuration may indicate both routing mapping #1 and routing mapping #2.

In operation 815, IAB donor 810B (e.g., CU of IAB donor 810B) may transmit at least one of the bearer mapping configuration associated with IAB node 820C and the UL routing configuration associated with IAB node 820C to IAB donor 810A (e.g., CU of IAB donor 810A).

In some examples, IAB donor 810B may transmit the above configuration(s) associated with IAB node 820C to IAB donor 810A via Xn interface signaling therebetween. In some other examples, IAB donor 810B may transmit the above configuration(s) associated with IAB node 820C to IAB donor 810A via NG interface signaling relayed by the core network (not shown in FIG. 8).

In operation 817, IAB donor 810A (e.g., CU of IAB donor 810A) may transmit the at least one of the bearer mapping configuration associated with IAB node 820C and the UL routing configuration associated with IAB node 820C to IAB node 820C (e.g., DU of IAB donor 810C) via, for example, an F1 interface.

In operation 819, the DU of IAB donor 810C may deliver the above configuration(s) to the MT of IAB donor 810C via, for example, an internal interface.

Figure 9:
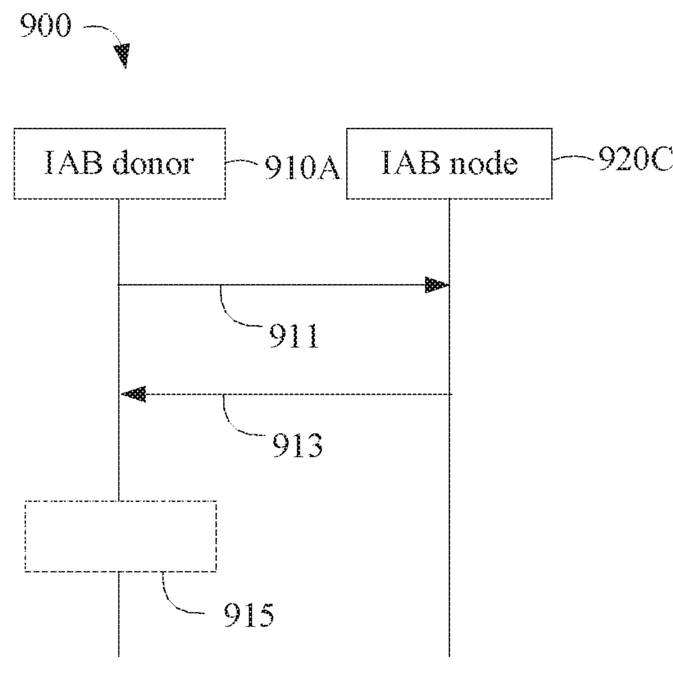
FIG. 9 illustrates a flow chart of an exemplary procedure of wireless communications in accordance with some embodiments of the present disclosure.

FIG. 9 illustrates a flow chart of an exemplary procedure 900 of wireless communications in accordance with some embodiments of the present disclosure. The exemplary procedure 900 shows a procedure between an IAB donor and an IAB node for determining whether to perform the migration of the DU of the IAB node after the migration of the MT of the IAB node to another IAB donor.

Details described in all of the foregoing embodiments of the present disclosure are applicable for the embodiments shown in FIG. 9. It should be appreciated by persons skilled in the art that the sequence of the operations in exemplary procedure 900 may be changed and some of the operations in exemplary procedure 900 may be eliminated or modified, without departing from the spirit and scope of the disclosure.

In some examples, IAB donor 910A and IAB node 920C may function as IAB donor 410A and IAB node 420C in FIG. 4, respectively. After handing over the MT of IAB node 920C from IAB donor 910A to another IAB donor (not shown in FIG. 9), the MT of IAB node 920C may be connected to the another IAB donor (target IAB donor) while the DU of IAB node 720C may still connect to IAB donor 910A. The exemplary procedure 900 may be performed to negotiate whether to hand over the DU of IAB node 920C to the target IAB donor.

Referring to FIG. 9, in operation 911, IAB donor 910A (e.g., CU of IAB donor 910A) may transmit a message to IAB node 920C (e.g., DU of IAB node 920C) via an F1 interface. The message may inquire whether to migrate the DU of IAB node 920C to the target IAB donor. The message may be referred to as an IAB-DU handover inquiry message, an IAB-DU migration inquiry message, an F1 handover inquiry message, or an F1 migration inquiry message.

In operation 913, in response to the inquiry message, IAB node 920C (e.g., DU of IAB node 920C) may transmit a response message to IAB donor 910A (e.g., CU of IAB donor 910A) via the F1 interface.

In some examples, the response message may refuse the migration of the DU of IAB node 920C. The response message may be referred to as an IAB-DU handover refuse message, an IAB-DU migration refuse message, an F1 handover refuse message, or an F1 migration refuse message.

In some examples, the response message may acknowledge the migration of the DU of IAB node 920C. The response message may be referred to as an IAB-DU handover acknowledge message, an IAB-DU migration acknowledge message, an F1 handover acknowledge message, or an F1 migration acknowledge message.

In operation 915 (denoted by the dotted block as an option), in response to the acknowledge message, IAB donor 910A (e.g., CU of IAB donor 910A) may initiate a procedure to hand over or migrate the DU of IAB node 920C to the target IAB donor. The procedure may be known as an IAB-DU handover procedure, an IAB-DU migration procedure, an F1 handover procedure, or an F1 migration procedure.

Figure 10:
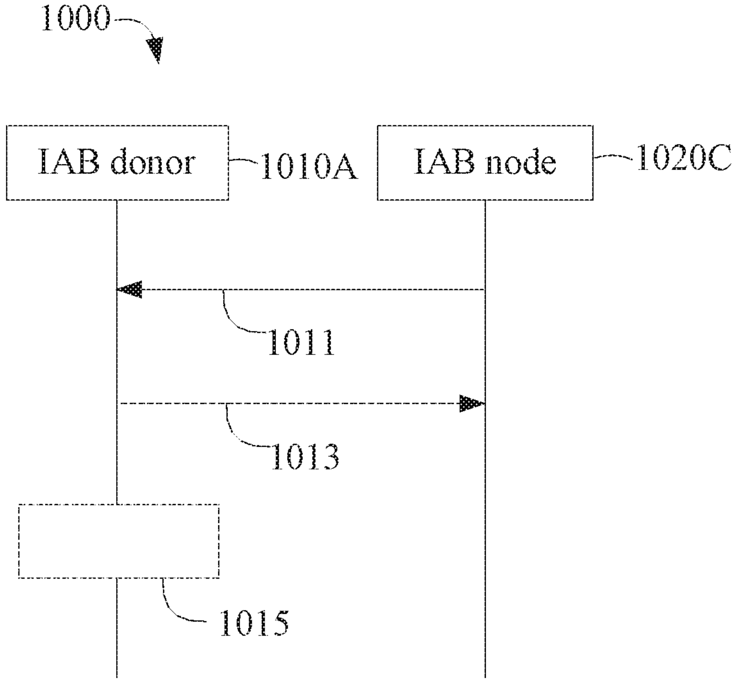
FIG. 10 illustrates a flow chart of an exemplary procedure of wireless communications in accordance with some embodiments of the present disclosure.

FIG. 10 illustrates a flow chart of an exemplary procedure 1000 of wireless communications in accordance with some embodiments of the present disclosure. The exemplary procedure 1000 shows a procedure between an IAB donor and an IAB node for determining whether to perform the migration of the DU of the IAB node after the migration of the MT of the IAB node to another IAB donor.

Details described in all of the foregoing embodiments of the present disclosure are applicable for the embodiments shown in FIG. 10. It should be appreciated by persons skilled in the art that the sequence of the operations in exemplary procedure 1000 may be changed and some of the operations in exemplary procedure 1000 may be eliminated or modified, without departing from the spirit and scope of the disclosure.

In some examples, IAB donor 1010A and IAB node 1020C may function as IAB donor 410A and IAB node 420C in FIG. 4, respectively. After handing over the MT of IAB node 1020C from IAB donor 1010A to another IAB donor (not shown in FIG. 10), the MT of IAB node 1020C may be connected to the another IAB donor (target IAB donor) while the DU of IAB node 1020C may still connect to IAB donor 1010A. The exemplary procedure 1000 may be performed to negotiate whether to hand over the DU of IAB node 1020C to the target IAB donor.

Referring to FIG. 10, in operation 1011, IAB node 1020C (e.g., DU of IAB node 1020C) transmit a message to IAB donor 1010A (e.g., CU of IAB donor 1010A) via an F1 interface. The message may request a migration of the DU of IAB node 1020C to the target IAB donor. The message may be referred to as an IAB-DU handover request message, an IAB-DU migration request message, an F1 handover request message, or an F1 migration request message.

In some examples, in operation 1013 (denoted by the dotted arrow as an option), in response to the request message, IAB donor 1010A (e.g., CU of IAB donor 1010A) may transmit a response message refusing the migration to IAB node 1020C (e.g., DU of IAB node 1020C) via the F1 interface. The response message may be referred to as an IAB-DU handover refuse message, an IAB-DU migration refuse message, an F1 handover refuse message, or an F1 migration refuse message.

In some examples, in operation 1015 (denoted by the dotted block as an option), in response to the request message, IAB donor 1010A (e.g., CU of IAB donor 1010A) may initiate a procedure to hand over or migrate the DU of IAB node 1020C to the target IAB donor. The procedure may be known as an IAB-DU handover procedure, an IAB-DU migration procedure, an F1 handover procedure, or an F1 migration procedure.

Figure 11:
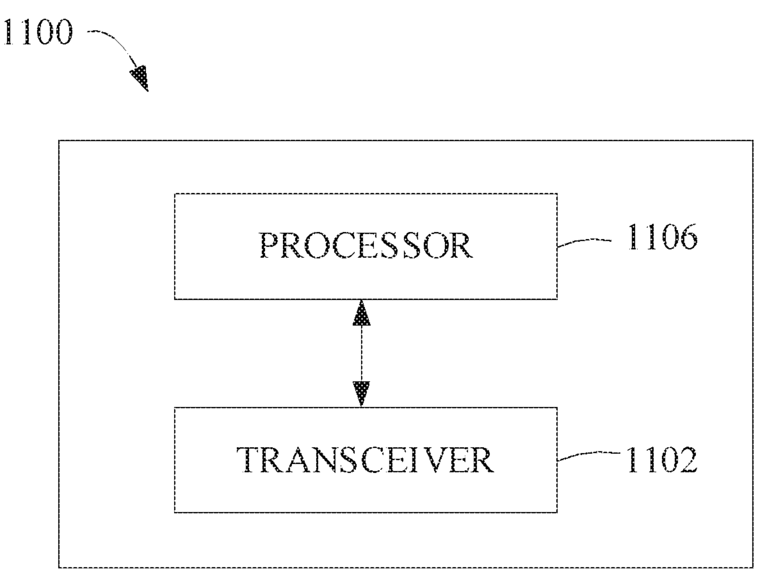
FIG. 11 illustrates a block diagram of an exemplary apparatus in accordance with some embodiments of the present disclosure.

FIG. 11 illustrates a block diagram of an exemplary apparatus 1100 according to some embodiments of the present disclosure.

As shown in FIG. 11, the apparatus 1100 may include at least one processor 1106 and at least one transceiver 1102 coupled to the processor 1106. The apparatus 1100 may be an IAB donor or an IAB node.

Although in this figure, elements such as the at least one transceiver 1102 and processor 1106 are described in the singular, the plural is contemplated unless a limitation to the singular is explicitly stated. In some embodiments of the present application, the transceiver 1102 may be divided into two devices, such as a receiving circuitry and a transmitting circuitry. In some embodiments of the present application, the apparatus 1100 may further include an input device, a memory, and/or other components.

In some embodiments of the present application, the apparatus 1100 may be an IAB donor. The transceiver 1102 and the processor 1106 may interact with each other so as to perform the operations with respect to the IAB donors described in FIGS. 1-10.

In some embodiments of the present application, the apparatus 1100 may be an IAB node. The transceiver 1102 and the processor 1106 may interact with each other so as to perform the operations with respect to the IAB nodes described in FIGS. 1-10.

In some embodiments of the present application, the apparatus 1100 may further include at least one non-transitory computer-readable medium.

For example, in some embodiments of the present disclosure, the non-transitory computer-readable medium may have stored thereon computer-executable instructions to cause the processor 1106 to implement the method with respect to the IAB donors as described above. For example, the computer-executable instructions, when executed, cause the processor 1106 interacting with transceiver 1102, so as to perform the operations with respect to the IAB donors described in FIGS. 1-10.

In some embodiments of the present disclosure, the non-transitory computer-readable medium may have stored thereon computer-executable instructions to cause the processor 1106 to implement the method with respect to the IAB nodes as described above. For example, the computer-executable instructions, when executed, cause the processor 1106 interacting with transceiver 1102, so as to perform the operations with respect to the IAB nodes described in FIGS. 1-10.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed is:

1. A method performed by an integrated access and backhaul (IAB) donor, comprising:

receiving, from another IAB donor, uplink (UL) ingress traffic information associated with an IAB node, a mobile terminal (MT) of the IAB node connected to the IAB donor and a distributed unit (DU) of the IAB node connected to the another IAB donor, wherein the UL ingress traffic information indicates an identity (ID) of an ingress channel of the IAB node; and transmitting, to the another IAB donor, at least one of a bearer mapping configuration associated with the IAB node or a UL routing configuration associated with the IAB node, the bearer mapping configuration and UL routing configuration based on the UL ingress traffic information.

2. The method of claim 1, wherein the UL ingress traffic information further indicates quality-of-service (QoS) information associated with the ingress channel.

3. The method of claim 1, wherein the UL ingress traffic information includes at least one of:

an ID of a UL ingress backhaul (BH) radio link control (RLC) channel (CH) between the IAB node and a child IAB node of the IAB node;

the ID of the UL ingress BH RLC CH and quality-of-service (QoS) information associated with the UL ingress BH RLC CH;

UL user plane (UP) transport network layer (TNL) information; or the UL UP TNL information, an ID of a data radio bearer (DRB) associated with the UL UP TNL information, and QoS information associated with the DRB.

4. A method performed by an integrated access and backhaul (IAB) donor, comprising:

transmitting, to another IAB donor, uplink (UL) ingress traffic information associated with an IAB node, a mobile terminal (MT) of the IAB node connected to the another IAB donor and a distributed unit (DU) of the IAB node connected to the IAB donor;

receiving, from the another IAB donor, at least one of a bearer mapping configuration associated with the IAB node and a UL routing configuration associated with the IAB node, the bearer mapping configuration and UL routing configuration based on the UL ingress traffic information; and transmitting the at least one of the bearer mapping configuration and the UL routing configuration directly to the DU of the IAB node via an F1 interface.

5. The method of claim 4, wherein the UL ingress traffic information indicates one or more of an ingress channel of the IAB node or both the ingress channel and quality-of-service (QoS) information associated with the ingress channel.

6. The method of claim 4, wherein the UL ingress traffic information comprises an identity (ID) of a UL ingress backhaul (BH) radio link control (RLC) channel (CH) between the IAB node and a child IAB node of the IAB node.

7. The method of claim 4, wherein the UL ingress traffic information comprises an identity (ID) of a UL ingress backhaul (BH) radio link control (RLC) channel (CH) between the IAB node and a child IAB node of the IAB node and quality-of-service (QoS) information associated with the UL ingress BH RLC CH.

8. The method of claim 4, wherein the UL ingress traffic information comprises UL user plane (UP) transport network layer (TNL) information.

9. The method of claim 4, wherein the UL ingress traffic information comprises UL user plane (UP) transport network layer (TNL) information, an identity (ID) of a data radio bearer (DRB) associated with the UL UP TNL information, and quality-of-service (QoS) information associated with the DRB.

10. An integrated access and backhaul (IAB) donor for wireless communication, comprising:

at least one memory; and at least one processor coupled with the at least one memory and configured to cause the IAB donor to:

receive, from another IAB donor, uplink (UL) ingress traffic information associated with an IAB node, a mobile terminal (MT) of the IAB node connected to the IAB donor and a distributed unit (DU) of the IAB node connected to the another IAB donor, wherein the UL ingress traffic information indicates an identity (ID) of an ingress channel of the IAB node; and transmit, to the another IAB donor, at least one of a bearer mapping configuration associated with the IAB node or a UL routing configuration associated with the IAB node, the bearer mapping configuration and UL routing configuration based on the UL ingress traffic information.

11. The IAB donor of claim 10, wherein the UL ingress traffic information further quality-of-service (QoS) information associated with the ingress channel.

12. The IAB donor of claim 10, wherein the UL ingress traffic information includes at least one of:

an ID of a UL ingress backhaul (BH) radio link control (RLC) channel (CH) between the IAB node and a child IAB node of the IAB node;

the ID of the UL ingress BH RLC CH and quality-of-service (QoS) information associated with the UL ingress BH RLC CH;

UL user plane (UP) transport network layer (TNL) information; or the UL UP TNL information, an ID of a data radio bearer (DRB) associated with the UL UP TNL information, and QoS information associated with the DRB.

13. An integrated access and backhaul (IAB) donor for wireless communication, comprising:

at least one memory; and at least one processor coupled with the at least one memory and configured to cause the IAB donor to:

transmit, to another IAB donor, uplink (UL) ingress traffic information associated with an IAB node, a mobile terminal (MT) of the IAB node connected to the another IAB donor and a distributed unit (DU) of the IAB node connected to the IAB donor;

receive, from the another IAB donor, at least one of a bearer mapping configuration associated with the IAB node and a UL routing configuration associated with the IAB node, the bearer mapping configuration and UL routing configuration based on the UL ingress traffic information; and transmit the at least one of the bearer mapping configuration and the UL routing configuration to the DU of the IAB node via an F1 interface.

14. The IAB donor of claim 13, wherein the UL ingress traffic information indicates an ingress channel of the IAB node or both the ingress channel and quality-of-service (QoS) information associated with the ingress channel.

15. The IAB donor of claim 13, wherein the UL ingress traffic information comprises an identity (ID) of a UL ingress backhaul (BH) radio link control (RLC) channel (CH) between the IAB node and a child IAB node of the IAB node.

16. The IAB donor of claim 13, wherein the UL ingress traffic information comprises an identity (ID) of a UL ingress backhaul (BH) radio link control (RLC) channel (CH) between the IAB node and a child IAB node of the IAB node and quality-of-service (QoS) information associated with the UL ingress BH RLC CH.

17. The IAB donor of claim 13, wherein the UL ingress traffic information comprises UL user plane (UP) transport network layer (TNL) information.

18. The IAB donor of claim 13, wherein the UL ingress traffic information comprises UL user plane (UP) transport network layer (TNL) information, an identity (ID) of a data radio bearer (DRB) associated with the UL UP TNL information, and quality-of-service (QoS) information associated with the DRB.

* * * * *